United States Patent
Li

(10) Patent No.: US 11,823,699 B2
(45) Date of Patent: Nov. 21, 2023

(54) SINGLE-CHANNEL AND MULTI-CHANNEL SOURCE SEPARATION ENHANCED BY LIP MOTION

(71) Applicant: Alibaba Group Holding Limited, George Town (KY)

(72) Inventor: Yun Li, Troy, MI (US)

(73) Assignee: Alibaba Group Holding Limited, George Town (KY)

( * ) Notice: Subject to any disclaimer, the term of this patent is extended or adjusted under 35 U.S.C. 154(b) by 0 days.

(21) Appl. No.: 17/751,428

(22) Filed: May 23, 2022

(65) Prior Publication Data
US 2022/0284594 A1    Sep. 8, 2022

Related U.S. Application Data

(63) Continuation of application No. 16/738,888, filed on Jan. 9, 2020, now Pat. No. 11,348,253.

(51) Int. Cl.
*G06T 7/20* (2017.01)
*G06K 9/00* (2022.01)
(Continued)

(52) U.S. Cl.
CPC .......... *G10L 21/028* (2013.01); *G06F 18/251* (2023.01); *G06N 20/10* (2019.01);
(Continued)

(58) Field of Classification Search
CPC . G06T 7/20; G06T 2207/30201; G06N 20/20; G06N 20/10; G06K 9/00281; G06K 9/00744; G06K 9/6289; G10L 21/028
See application file for complete search history.

(56) References Cited

U.S. PATENT DOCUMENTS

| 5,434,913 A | 7/1995 | Tung |
| 5,488,570 A | 1/1996 | Agarwal |

(Continued)

OTHER PUBLICATIONS

Office Action for U.S. Appl. No. 16/738,888, dated Jun. 4, 2021, Li, "Single-Channel and Multi-Channel Source Separation Enhanced By Lip Motion", 10 Pages.
(Continued)

*Primary Examiner* — David F Dunphy
(74) *Attorney, Agent, or Firm* — Lee & Hayes, P.C.

(57) ABSTRACT

Methods and systems are provided for implementing source separation techniques, and more specifically performing source separation on mixed source single-channel and multi-channel audio signals enhanced by inputting lip motion information from captured image data, including selecting a target speaker facial image from a plurality of facial images captured over a period of interest; computing a motion vector based on facial features of the target speaker facial image; and separating, based on at least the motion vector, audio corresponding to a constituent source from a mixed source audio signal captured over the period of interest. The mixed source audio signal may be captured from single-channel or multi-channel audio capture devices. Separating audio from the audio signal may be performed by a fusion learning model comprising a plurality of learning sub-models. Separating the audio from the audio signal may be performed by a blind source separation ("BSS") learning model.

20 Claims, 13 Drawing Sheets

(51) Int. Cl.
| | |
|---|---|
| *G06K 9/62* | (2022.01) |
| *G06N 20/10* | (2019.01) |
| *G06N 20/20* | (2019.01) |
| *G10L 21/028* | (2013.01) |
| *G06V 20/40* | (2022.01) |
| *G06V 40/16* | (2022.01) |
| *G06F 18/25* | (2023.01) |
| *G06V 10/764* | (2022.01) |
| *G06V 10/80* | (2022.01) |
| *G06V 10/82* | (2022.01) |

(52) U.S. Cl.
CPC ............ *G06N 20/20* (2019.01); *G06T 7/20* (2013.01); *G06V 10/764* (2022.01); *G06V 10/806* (2022.01); *G06V 10/82* (2022.01); *G06V 20/46* (2022.01); *G06V 40/171* (2022.01); *G06T 2207/30201* (2013.01)

(56) References Cited

U.S. PATENT DOCUMENTS

| | | | |
|---|---|---|---|
| 6,570,078 | B2 | 5/2003 | Ludwig |
| 7,309,829 | B1 | 12/2007 | Ludwig |
| 9,565,419 | B2 | 2/2017 | Presler |
| 10,475,440 | B2 | 11/2019 | Hiroe |
| 2002/0005108 | A1 | 1/2002 | Ludwig |
| 2005/0120870 | A1 | 6/2005 | Ludwig |
| 2015/0325240 | A1 | 11/2015 | Li |
| 2018/0234612 | A1 | 8/2018 | Kunkel |
| 2018/0239955 | A1 | 8/2018 | Rodriguez |
| 2018/0247651 | A1* | 8/2018 | Ko .................... G06V 40/20 |
| 2020/0335121 | A1 | 10/2020 | Mosseri et al. |
| 2020/0342234 | A1* | 10/2020 | Gan .................. G06V 10/82 |
| 2021/0134312 | A1* | 5/2021 | Koishida ............ G06V 20/46 |
| 2021/0217182 | A1 | 7/2021 | Li |

OTHER PUBLICATIONS

Office Action for U.S. Appl. No. 16/738,888, dated Sep. 23, 2021, "Single-Channel and Multi-Channel Source Separation Enhanced By Lip Motion", 11 Pages.

Stafylikis, et al., "Combining Residual Networks with LSTMs for Lipreading", arXiv preprint arXiv:1703.04105, 2017, 5 pgs.

* cited by examiner

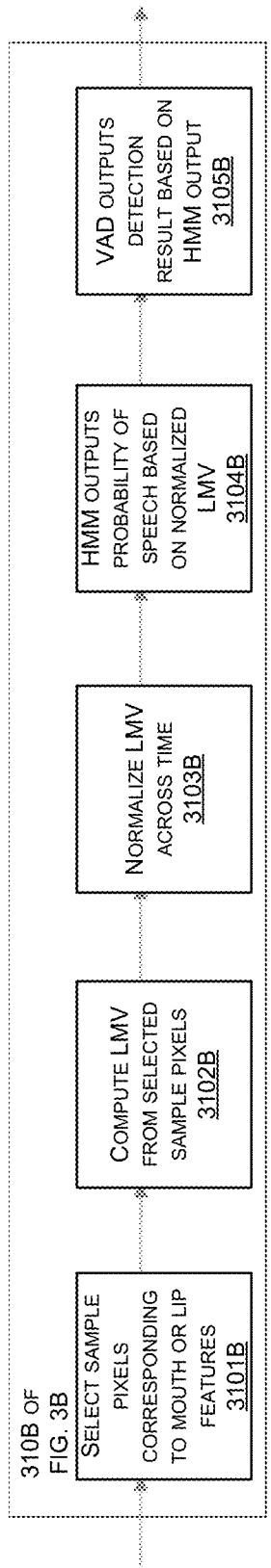

SINGLE-CHANNEL AND MULTI-CHANNEL SOURCE SEPARATION ENHANCED BY LIP MOTION

CROSS REFERENCE TO RELATED PATENT APPLICATIONS

The present disclosure claims priority to and is a continuation of U.S. patent application Ser. No. 16/738,888 filed on Jan. 9, 2020, entitled "SINGLE-CHANNEL AND MULTI-CHANNEL SOURCE SEPARATION ENHANCED BY LIP MOTION", which is hereby incorporated by reference in its entirety.

BACKGROUND

In data processing, source separation is a broad and open-ended problem wherein signals are received, observed or otherwise input from multiple sources; in particular, blind source separation ("BSS") describes source separation scenarios where the number and the nature of different signal sources is not known beforehand. It is desirable to separate signals from each other in the absence of information regarding signal sources.

Depending on a setting where signals are derived, context for signal sources may be acquired that assists in determining signal sources. For example, at automated public self-service kiosk machines, particularly at locations with high public traffic intake such as transit stations, theaters, tourist attractions, border crossings, and the like, multiple queues may be established at least during busy hours to increase throughput and decrease wait times for transactions such as ticketing, document validation, and the like. To further increase throughput and decrease wait times, voice recognition technology may be deployed at self-service kiosk machines to enable self-service transactions to be performed without human cashier involvement and also without users manually operating physical interfaces, improving efficiency of self-service transactions.

However, in these high public traffic settings, transactions are generally performed in close adjacency to each other due to a need to manage public space. Automated self-service kiosks at high public traffic locations therefore create a source separation problem in such settings, depending on particular contexts; the challenges presented by these particular contexts should be solved in a context-dependent manner.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIGS. 3A, 3B, and 3C illustrate flowcharts of preprocessing processes for audio signals and target speaker facial images to be input into a learning model for single-channel source separation or multi-channel source separation computations according to example embodiments of the present disclosure.

DETAILED DESCRIPTION

Figure 1:
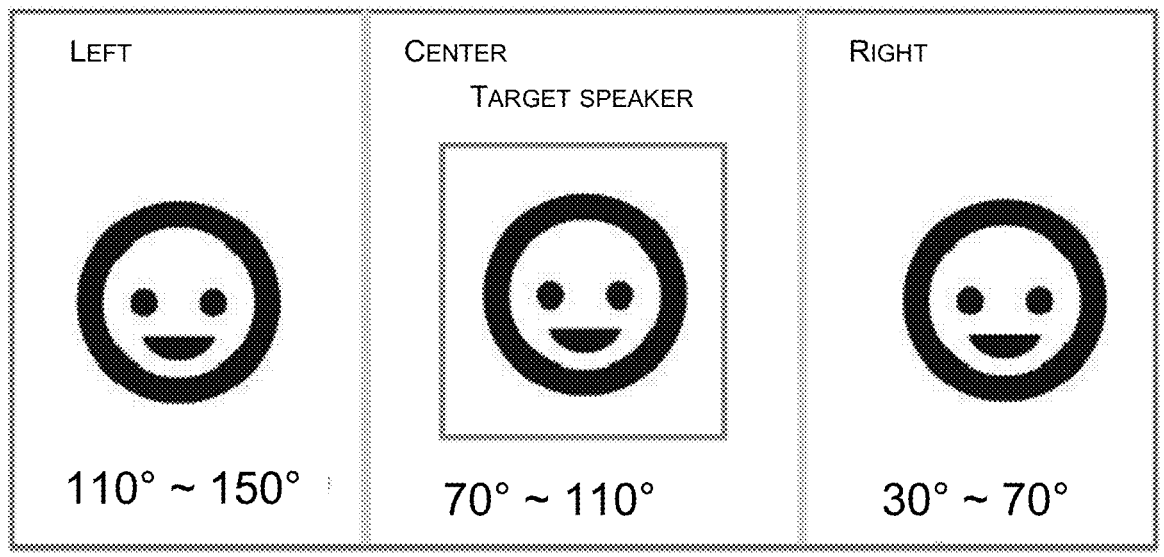
FIG. 1 illustrates a diagram of an example still image, video frame, and/or facial image captured by an image capture device according to example embodiments of the present disclosure.

Systems and methods discussed herein are directed to implementing source separation techniques, and more specifically performing source separation on mixed source single-channel and multi-channel audio signals enhanced by inputting lip motion information from captured image data.

A learning model, according to example embodiments of the present disclosure, may be a defined computation algorithm executable by one or more processors of a computing system to perform tasks that include processing input having various parameters and outputting results. A learning model may be, for example, a layered model such as a deep neural network, which may have a fully-connected structure, may have a feedforward structure such as a convolutional neural network ("CNN"); may have a backpropagation structure such as a recurrent neural network ("RNN"); may further be structured having layers outputting in opposite directions, such as a bidirectional recurrent neural network ("BRNN"); may further be structured having feedback loops within layers, such as a long short-term memory ("LSTM") neural network; may further combine these structures, such as a bidirectional long short-term memory ("BLSTM") neural network; and may or may have other architectures suited to the computation of particular tasks. Tasks may include, for example, classification, clustering, matching, regression, and the like.

Tasks may provide output for the performance of functions such as recognizing entities in images and/or video; tracking movement of entities in video frames in real-time; matching recognized entities in images and/or video to other images and/or video; providing annotations or transcriptions of images, video, and/or audio in real-time; and the like. A learning model may configure a computing system to perform computations for a task on inputs of, for example, any or several types as described above, wherein the inputs are generally compressed and features extracted therefrom before the computing system performs computations upon the extracted features.

A learning model may be trained to configure a computing system to compute a task taking images as input, such tasks providing output for functions including image classification or computer vision. With regard to image input, features extracted therefrom (herein referred to as "image feature(s)

") may include, for example, edge features, corner features, and blob features as known to persons skilled in the art.

A learning model may be trained to configure a computing system to compute a task taking facial images as input, such tasks providing output for functions including facial recognition or facial matching. With regard to facial image input, features extracted therefrom (herein referred to as "facial feature(s)") may include, for example, eye features, nose features, and mouth features.

With regard to facial features, it should be noted for the purpose of understanding example embodiments of the present disclosure that concepts such as "eye features," "nose features," and "mouth features" are generally high-level descriptions of an intuition that, somewhere in input facial images, image features (such as types of image features described above) corresponding to eyes, noses, mouths, and other such familiar parts of human faces may be extracted. Labels such as "eye features," "nose features," or "mouth features," etc., however, are generally not understood by persons skilled in the art as suggesting or being limited to any particular rules, principles, precepts, guidelines, standards, or otherwise techniques or solutions for identifying features in facial images that correspond to eyes, noses, mouths, and the like. Instead, depending on the nature of input facial images and contexts in which input facial images were captured, any technique for corresponding image features to eyes, noses, mouths, etc. may be deemed valid by persons skilled in the art.

A learning model may be trained to configure a computing system to compute a task taking video as input, such as tasks providing output for functions such as video tracking or video annotation. With regard to video input, features extracted therefrom (herein referred to as "video feature(s)") may include, for example, motion features as known to persons skilled in the art.

A learning model according to example embodiments of the present disclosure may be referred to by a prefix referencing a type of input which the learning model takes. For example, a BLSTM neural network which takes audio as input may be referred to as an audio BLSTM ("A-BLSTM"); a BLSTM neural network which takes video as input may be referred to as a video BLSTM ("V-BLSTM"); and a BLSTM neural network which takes multiple such types of input may be referred to as a fusion BLSTM ("F-BLSTM").

Cloud computing systems may provide collections of servers hosting computing resources to provide distributed computing, parallel computing, improved availability of physical or virtual computing resources, and such benefits. Data centers implemented in cloud computing systems may host learning models to provide these benefits for the application of computing using learning models.

A cloud computing system may connect to various end devices which collect data to be input into learning models to train the learning models and/or in association with various tasks for the computation and output of results required for the performance of those tasks. End devices may connect to the cloud computing system through edge nodes of the cloud computing system. An edge node may be any server providing an outbound connection from connections to other nodes of the cloud computing system, and thus may demarcate a logical edge, and not necessarily a physical edge, of a network of the cloud computing system. Moreover, an edge node may be edge-based logical nodes that deploy non-centralized computing resources of the cloud computing system, such as cloudlets, fog nodes, and the like.

End devices may compute multiple types of tasks involving multiple types of input data. For example, an end device may be an image capture device such as a video camera installed at a self-service kiosk, the video camera collecting still images, video, and facial image data which may originate from users of the self-service kiosk. According to another example, an end device may be an audio capture device such as a microphone installed at a self-service kiosk, the microphone collecting audio which may originate from users of the self-service kiosk. The self-service kiosk overall may be another end device, which may connect to an edge node of a cloud computing system which performs real-time facial tracking (as shall be described in further detail subsequently), facial recognition, or real-time speech recognition (as shall be described in further detail subsequently) of users of the self-service kiosk, and sends each of these types of data in real-time to the cloud computing system to perform various tasks related to real-time processing of self-service transactions.

At a particular station, business, or other location having public traffic where self-service transactions are conducted, multiple self-service kiosks may be installed and operated to conduct self-service transactions and compute backend tasks supporting self-service transactions. Public traffic through these locations may be diverted according to positioning of the self-service kiosks; for example, self-service kiosks may be positioned adjacent to each other in a row. Such a configuration may cause public traffic to be organized into parallel queues, where each self-service kiosk is positioned at the head of a queue, such that the kiosks perform transactions for individuals or groups at heads of each queue in parallel. In the event that voice recognition technology is deployed in these settings, persons at the head of each queue may speak at the same time, leading to audio capture devices at each kiosk picking up voice signals from multiple queues.

According to example embodiments of the present disclosure, backend tasks which are computed to support self-service transactions may include, for example, classification of entities detected in video by a video CNN ("V-CNN"); signal processing and filtering of recorded audio in, for example, the frequency domain; frame extraction and feature embedding from a video stream; and the like.

According to example embodiments of the present disclosure, self-service kiosks as end devices may be configured to transfer captured input data such as still images, video, facial image data, and audio signals over one or more networks to one or more remote computing hosts, such as a data center hosting high-capacity computing resources, to perform computing of backend tasks as described above using captured input data. Due to large file sizes of raw input data such as still images, video, facial image data, and audio signals, input data may be compressed or otherwise preprocessed at the end devices prior to being transferred over one or more networks, and/or end devices may be configured to perform edge processing of backend tasks as described above using the input data. Edge processing may be limited in computation capacity and scope.

Tasks and data associated therewith may be delivered from end devices to one or more remote computing hosts over interfaces hosted at a cloud computing system. End devices such as self-service kiosks may be geographically remote from the one or more remote computing hosts, resulting in network latency in the transportation of tasks and associated data. The relatively lower computing resource specifications of end devices compared to the remote computing hosts, including processing power, storage, and memory, also results in a relative disparity in computational capacity therebetween. It is generally known to perform various forms of preprocessing on data in order to address network latency and disparity in computational capacity so as to improve response time and efficiency in completing tasks.

For example, massive quantities of locally captured data at edge devices may result in intolerable degrees of latency if delivered over cloud computing interfaces for computing by a learning model executing on remote computing hosts. Moreover, images, video, or audio in raw, uncompressed formats are highly inefficient for computation for classification or embedding due to containing many times more data, often superfluous for computation purposes, than compressed images, video, or audio. Consequently, training of learning models according to example embodiments of the present disclosure is generally performed using training datasets, which may be massive training datasets, which are input or loaded onto the remote computing hosts through offline inputs, without transporting those datasets over networks. Training datasets may include, for example, known, source-separated audio recordings from users of self-service kiosks during transactions as described above.

Furthermore, it is generally known to transform data into a frequency representation by a transform algorithm such as, for example, Fourier transform, and to transform audio data from a time domain representation (i.e., wave data) into a frequency domain representation by Fourier-related algorithms such as short-time Fourier transform ("STFT"). An inverse of the STFT ("ISTFT") may further operate to return a frequency domain representation of audio data to a time domain representation. Commonly, STFT is utilized by dividing a time domain representation of audio data into time windows of known duration; frequency-domain representations in each time window (henceforth referenced as "time-frequency representations") may be subsequently visualized in spectrograms showing the magnitude STFT of the audio signals. Moreover, in discrete-time applications of STFT, the audio signals may be divided over the time domain into discrete frames having some overlap, the frames being individually preprocessed by STFT.

After preprocessing by STFT, time-frequency representations of audio data may be separable into bands and sub-bands thereof, each band and sub-bands thereof representing particular frequencies of the audio signals. Frequency domain representations of audio data may be referenced by parameters k indicating a particular band or sub-band thereof, and t representing a particular frame thereof.

Generally, as source separation remains an open-ended problem, it is possible to perform source separation using either time-domain representations of audio signals or time-frequency representations of audio signals. According to example embodiments of the present disclosure, audio signals captured by end devices may be preprocessed by STFT and converted to time-frequency representations thereof. Such preprocessing may be performed as edge processing at end devices or may be performed by remote computing hosts after audio data is transported to the remote computing hosts. Preprocessing to convert audio signals to time-frequency representations thereof may facilitate further preprocessing tasks, such as noise and interference removal, and may also facilitate source separation techniques as shall be described below.

According to example embodiments of the present disclosure, captured audio signals may be single-channel audio signals. In other words, the captured audio signals may be captured from a single microphone. Such example embodiments of the present disclosure may implement single-source or monaural source separation techniques upon single-channel audio signals as input data. A-CNNs, A-RNNs, A-LSTMs and A-BLSTMs may be examples of learning models operative to compute single-channel audio signals as input data for this objective. The A-LSTM and A-BLSTM learning model structures, in particular, may utilize feedback loops in order to retain "memory" and effectively perform source separation over long sequences of audio signals.

According to example embodiments of the present disclosure, captured audio signals may be multi-channel audio signals. In other words, the captured audio signals may be captured from multiple microphones. For example, a single end device, such as a single self-service kiosk, may have multiple microphones installed therein to each capture audio from the same sources, or multiple microphones of multiple end devices positioned adjacent to each other may each capture audio from the same sources. Such example embodiments of the present disclosure may implement multi-channel source separation techniques upon multi-channel audio signals as input data.

A learning model computing audio signals according to example embodiments of the present disclosure may determine a mask to apply to a time-frequency representation of audio signals. A mask may be a matrix or vector in the frequency domain which, when applied to a time-frequency representation of mixed-source audio signals by an operation (such as a multiplication operation against each frame), yields at least one of the constituent sources of the mixed-source audio signal. In particular, a target mask may be a mask which yields an objective constituent source of the mixed-source audio signal which is, according to example embodiments of the present disclosure, a target speaker. A noise mask may be a mask which at least reduces constituent audio of the mixed-source audio signal which does not correspond to any source, or does not correspond to the objective source. A time-frequency representation of an audio signal having a mask applied thereto may be transformed by inverse STFT to reconstruct a time-domain representation of the audio signal which yields at least one of the constituent sources of the mixed-source audio signal or yields audio of the mixed-source audio signal having reduced noise and interference.

Alternately, a learning model computing audio signals according to example embodiments of the present disclosure may apply a voice activity detection ("VAD") system to a time-frequency representation of audio signals. Generally, a VAD may be a state machine which receives an input frame and outputs either 0 for determining the frame to be non-speech or 1 for determining the frame to be speech. Generally, a VAD may be applied to single-channel audio signals or multi-channel audio signals, though application of a VAD to multi-channel audio signals may enhance performance of the VAD by utilizing comparisons between redundant audio signals of the multiple channels. Frames output by the VAD as determined to be speech may be transformed by inverse STFT to reconstruct a time-domain representation of the audio signal which yields frames including speech, including speech of the target speaker.

Output from a learning model computing audio signals may provide classifications of time-frequency frames and bins thereof by labeling such frames and bins thereof as matching respective speakers, including a target speaker as described above. Speakers may be known speakers or unknown speakers; unknown speakers labeled in output from a learning model may, regardless, be distinguished as distinct speakers from other unknown speakers.

Signal separation techniques as described above wherein computation is performed solely on audio signals may be further enhanced by providing context to the learning model regarding speakers and timing of their speech. According to example embodiments of the present disclosure, context may be provided by performing computation on still images, video, and/or facial image data provided by image capture devices such as video cameras of end devices such as self-service kiosks. Alternately, still images, video, and/or facial image data may be provided by image capture devices such as cameras of mobile devices carried by users of the self-service kiosks. For example, a user may authenticate with, log in to, exchange information with, or otherwise interact with the self-service kiosks through initiating a communication protocol between the mobile device and the self-service kiosk by, for example, a short-range communication protocol. By operation of the short-range communication protocol, the self-service kiosk may request the user to provide self-captured still images, video, and/or facial image data from an image capture device of the mobile device.

According to example embodiments of the present disclosure, still images, video, and/or facial image data may provide context for source separation by extracting facial features from the still images, video, and/or facial image data. For example, still images, video, and/or facial image data captured by an image capture device in the context of self-service kiosk transactions may capture a frontal perspective facing at least one user of a self-service kiosk. FIG. 1 illustrates a diagram of an example still image, video frame, and/or facial image captured by an image capture device according to example embodiments of the present disclosure.

One or more faces may be detected by a learning model computing the still image, video frame, and/or facial image based on multiple face recognition techniques as know in the art; such techniques shall not be described in detail herein. For the purpose of understanding example embodiments of the present disclosure, it shall suffice to understand that one or more faces may be detected from the image. The one or more faces may be detected over different viewing angles from a perspective of the image capture device, depending on a field of vision of the image capture device. For example, as illustrated by FIG. 1, viewing angles may range from 30° for faces detected over at least the rightmost pixels of the still image, video frame, and/or facial image, to 150° for faces detected over at least the leftmost pixels of the still image, video frame, and/or facial image, with 90° defined as directly in front of the image capture device (assuming the image capture device has a field of view of approximately 120°). A portion of the still image, video frame, and/or facial image containing the detected face of the target speaker may be extracted therefrom as a target speaker facial image.

According to example embodiments of the present disclosure, one of the faces detected from the still image, video frame, and/or facial image may be designated as a target speaker for the purpose of designating an objective for source separation computation. In particular, a face detected over a range of angles including a frontal angle from the image capture device (for example, a range of angles encompassing a 90° angle) may be designated as a target speaker. Alternately, a face detected over a range of angles closest to a frontal angle from the image capture device may be designated as a target speaker. Moreover, a detected face may be designated as a target speaker based on orientation of the face from the image capture device; for example, a face designated as a target speaker may be a face oriented head-on to the image capture device. Thus, based on angles of a target speaker from the image capture device, the source speaker may be localized relative to the image capture device, as well as relative to the microphone(s) which captured each audio signal.

According to multi-channel source example embodiments of the present disclosure, knowledge of configuration of multiple microphones relative to each other in space, each relative to localization of the target speaker, may be utilized in computation of source separation tasks by a learning model. Moreover, location of a target speaker may be tracked across multiple still images, video frames, and/or facial images, or tracked across multiple frames of a video stream.

By these and similar principles, localization of a target speaker may be correlated with one or more audio signals, providing enhancement of computation of source separation by a learning model. Below, techniques shall be described by which localization of a target speaker is further utilized in combination with facial feature extraction, providing further enhancement above and beyond that of speaker localization, in both single-channel example embodiments and multi-channel example embodiments of the present disclosure.

Figure 2A:
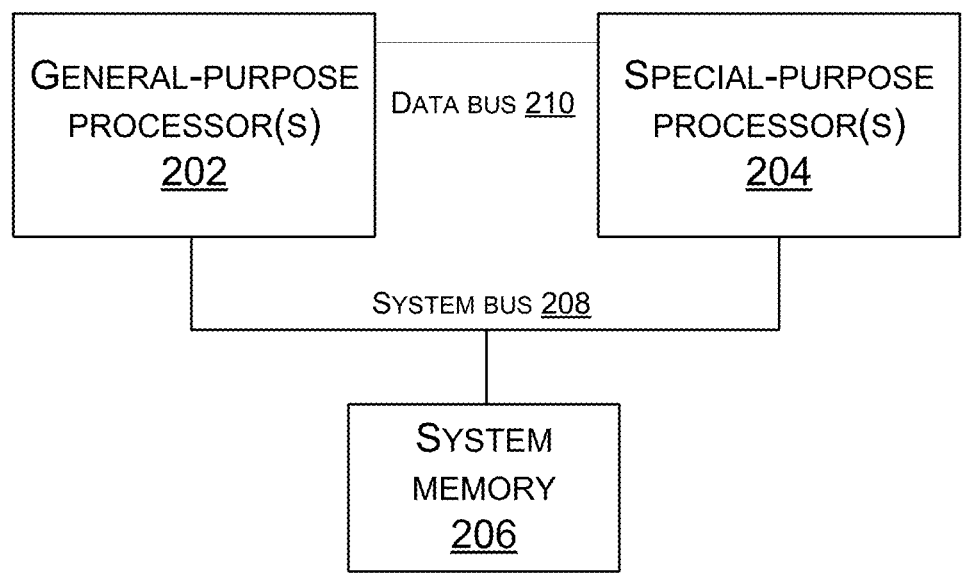
FIG. 2A illustrates a system architecture of a system configured to compute source separation according to example embodiments of the present disclosure.
Figure 2B:
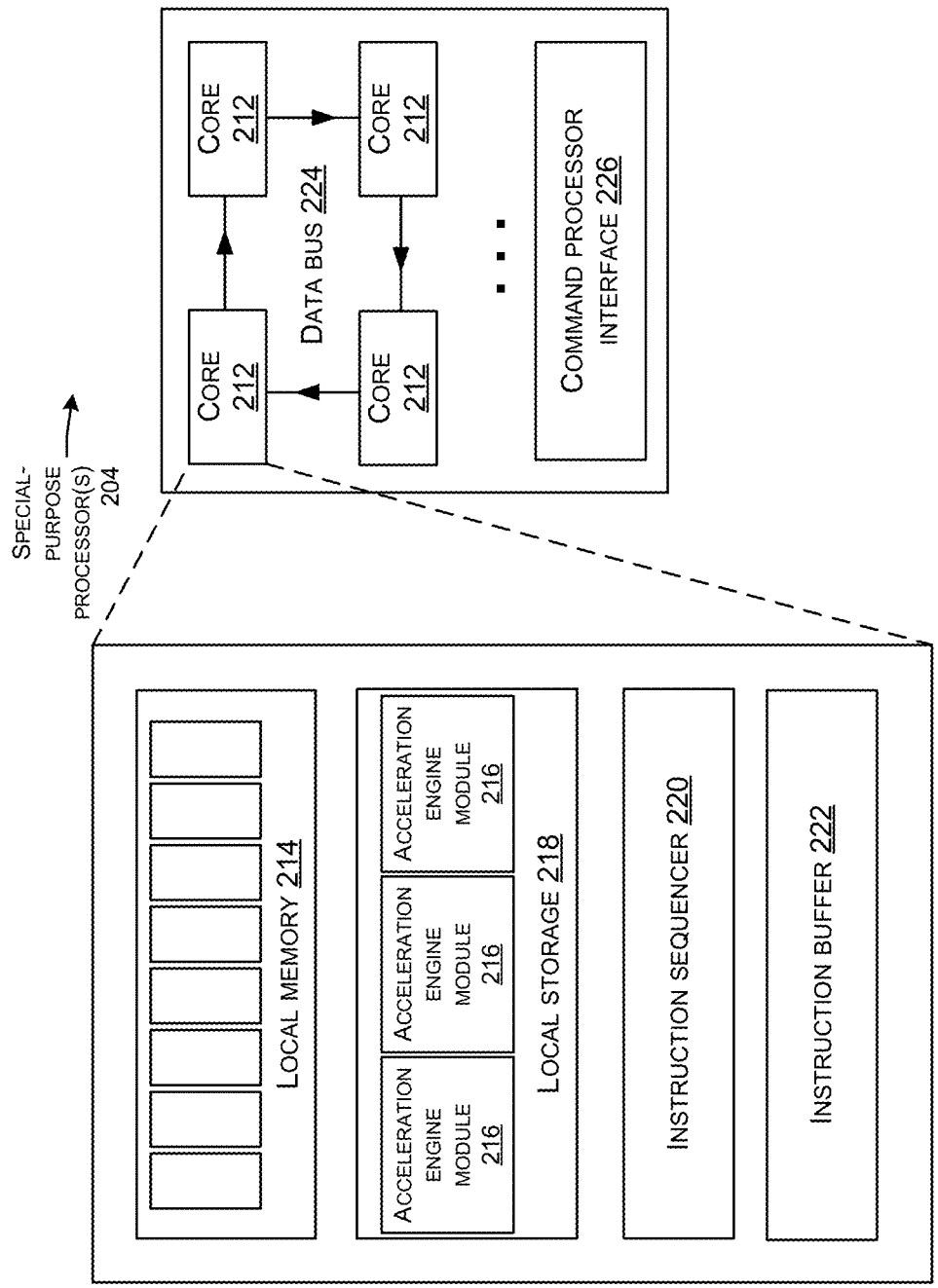
FIG. 2B illustrates a special-purpose processor according to examples of FIG. 2A.

FIG. 2A illustrates a system architecture of a system 200 configured to compute source separation according to example embodiments of the present disclosure. FIG. 2B illustrates a special-purpose processor according to examples of FIG. 2A.

A system 200 according to example embodiments of the present disclosure may include one or more general-purpose processor(s) 202 and one or more special-purpose processor(s) 204. The general-purpose processor(s) 202 and special-purpose processor(s) 204 may be physical or may be virtualized and/or distributed. The general-purpose processor(s) 202 and special-purpose processor(s) 204 may execute one or more instructions stored on a computer-readable storage medium as described below to cause the general-purpose processor(s) 202 or special-purpose processor(s) 204 to perform a variety of functions. Special-purpose processor(s) 204 may be computing devices having hardware or software elements facilitating computation of neural network computing tasks such as training and inference computations. For example, special-purpose processor(s) 204 may be accelerator(s), such as Neural Network Processing Units ("NPUs"), Graphics Processing Units ("GPUs"), Tensor Processing Units ("TPU"), implementations using field programmable gate arrays ("FPGAs") and application specific integrated circuits ("ASICs"), and/or the like. To facilitate computation of tasks such as training and inference, special-purpose processor(s) 204 may, for example, implement engines operative to compute mathematical operations such as matrix operations and vector operations.

A system 200 may further include a system memory 206 communicatively coupled to the general-purpose processor(s) 202 and the special-purpose processor(s) 204 by a system bus 208. The system memory 206 may be physical or may be virtualized and/or distributed. Depending on the exact configuration and type of the system 200, the system memory 206 may be volatile, such as RAM, non-volatile, such as ROM, flash memory, miniature hard drive, memory card, and the like, or some combination thereof.

The system bus 208 may transport data between the general-purpose processor(s) 202 and the system memory 206, between the special-purpose processor(s) 204 and the system memory 206, and between the general-purpose processor(s) 202 and the special-purpose processor(s) 204. Furthermore, a data bus 210 may transport data between the general-purpose processor(s) 202 and the special-purpose processor(s) 204. The data bus 210 may, for example, be a Peripheral Component Interconnect Express ("PCIe") connection, a Coherent Accelerator Processor Interface ("CAPI") connection, and the like.

FIG. 2B illustrates an example of special-purpose processor(s) 204, including any number of core(s) 212. Processing power of the special-purpose processor(s) 204 may be distributed among the core(s) 212. Each core 212 may include local memory 214, which may contain pre-initialized data, such as model weights, or data structures, such as constant buffers for batch normalization or quantization, for the performance of special-purpose computing. Each core 212 may further be configured to execute one or more sets of computer-executable acceleration engine modules 216 pre-initialized on local storage 218 of the core 212, which may each be executable by the core(s) 212, including execution in parallel by multiple core(s) 212, to perform or accelerate, for example, arithmetic operations such as matrix multiplication or matrix transposition, function operations such as convolution, specially defined operations such as pooling of convolutional layers, interpolation, or region-of-interest operations, data operations. Each core 212 may further include an instruction sequencer 220, which receives and orders instructions received from an instruction buffer 222. Some number of core(s) 212, such as four, may be in communication by a data bus 224, such as a unidirectional ring bus. Software drivers controlling operation of each core 212 may control the core(s) 212 and synchronize their operations by sending executable commands through a command processor interface 226.

Generally, time-frequency representations of audio signals are input into an input layer of learning models according to example embodiments of the present disclosure. Thus, as it is also desirable to minimize transportation of data over a system bus 208 or a data bus 210, in order to maximize computation throughput, audio signals may be processed by STFT into a time-frequency representation thereof prior to transportation over a system bus 208 or a data bus 210. For example, STFT processing may be performed on the general-purpose processor(s) 202, and time-frequency representations of audio signals may be transported to the special-purpose processor(s) 204 where learning model computation may be performed by the special-purpose processor(s) 204 on the time-frequency representations of audio signals. Alternately, STFT processing may be performed on the end devices as described below with reference to FIG. 6, and time-frequency representations of audio signals may be transported over one or more networks to a remote computing host where the system 200 is hosted, where learning model computation may be performed by the special-purpose processor(s) 204 on the time-frequency representations of audio signals. Subsequently, outputs of the learning model, such as a masked time-frequency representation of an audio signal, or frames of a time frequency representation of an audio signal output by a VAD, may be transformed by inverse STFT to reconstruct a time-domain representation of the audio signal which yields audio spoken by the target speaker. Again, to maximize computing throughput, outputs of the learning model may be transported back to general-purpose processor(s) 202 to undergo inverse STFT.

Furthermore, still images, video frames, and/or facial images according to example embodiments of the present disclosure, or a target speaker facial image extracted therefrom, may be transported to special-purpose processor(s) 204 over a system bus 208 or a data bus 210, where learning model computation may be performed by the special-purpose processor(s) 204 on the still images, video frames, and/or facial images, or a target speaker facial image extracted therefrom, to perform facial recognition. Still images, video frames, and/or facial images may be captured as uncompressed bitmap images represented in the spatial domain, which may generally be compressed by various coding algorithms to derive frequency-domain representations of the uncompressed images, upon which preprocessing may be further performed to facilitate facial recognition computation. Compression of the still images, video frames, and/or facial images, or a target speaker facial image extracted therefrom, may be performed at end devices, such as a self-service kiosk or a mobile device as described above, to avoid the transport of uncompressed still images, video frames, and/or facial images, or a target speaker facial image extracted therefrom, over one or more networks to a remote computing host. Further preprocessing of the still images, video frames, and/or facial images, or a target speaker facial image extracted therefrom, may be performed upon the frequency-domain representations thereof, as in the computation of images by learning models, generally not all data of the images is relevant to the computations. As examples for illustrative purposes, in processing of data in frequency domain representations thereof, it is generally known to utilize high-pass or low-pass filters to decrease or remove low-frequency or high-frequency data, respectively.

Thus, example embodiments of the present disclosure propose computation of both time-frequency representations of audio signals, and frequency-domain representations of at least a target speaker facial image, by transportation thereof to one or more special-purpose processor(s) of a remote computing host.

Figure 3A:
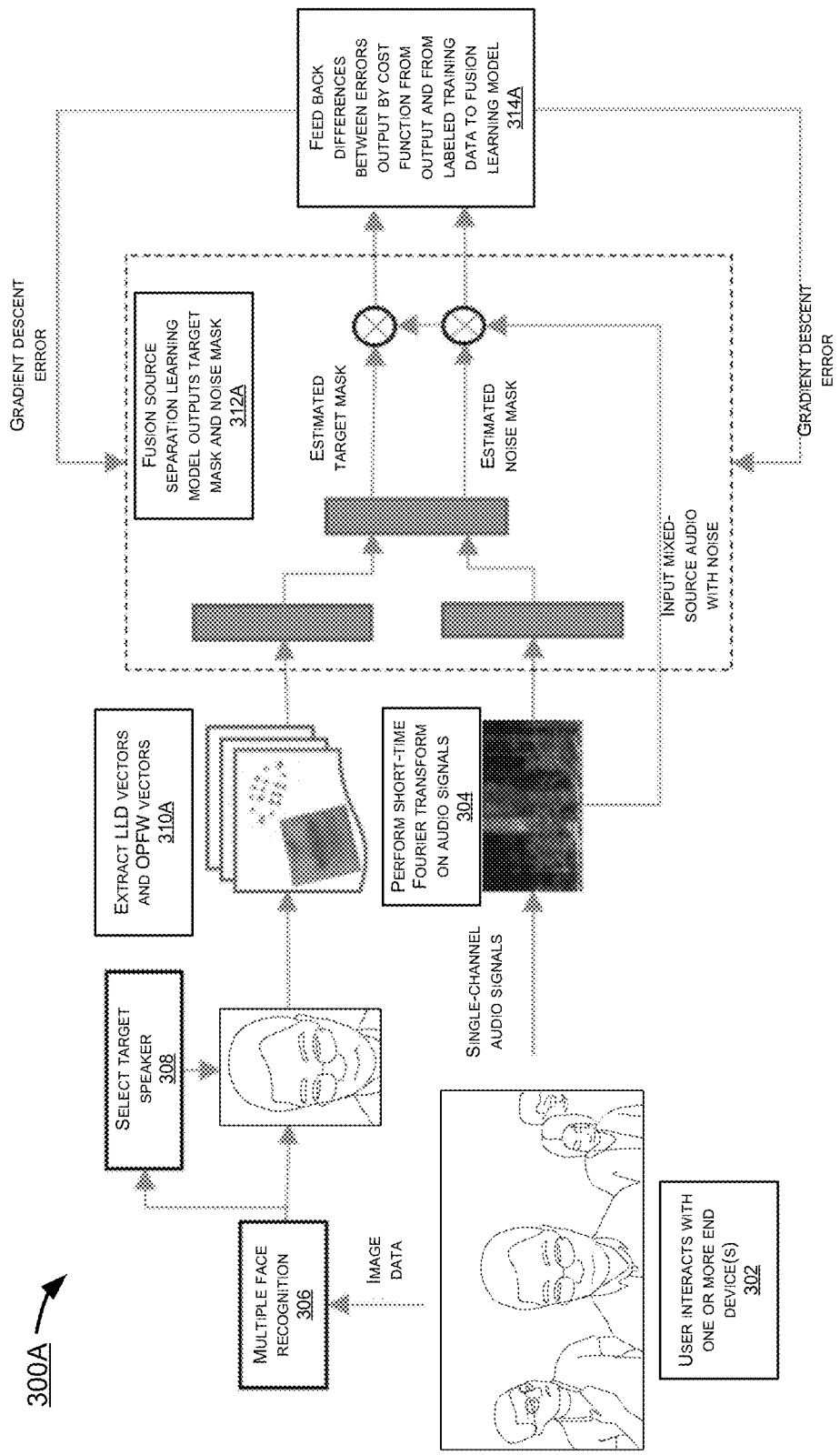
Figure 3B:
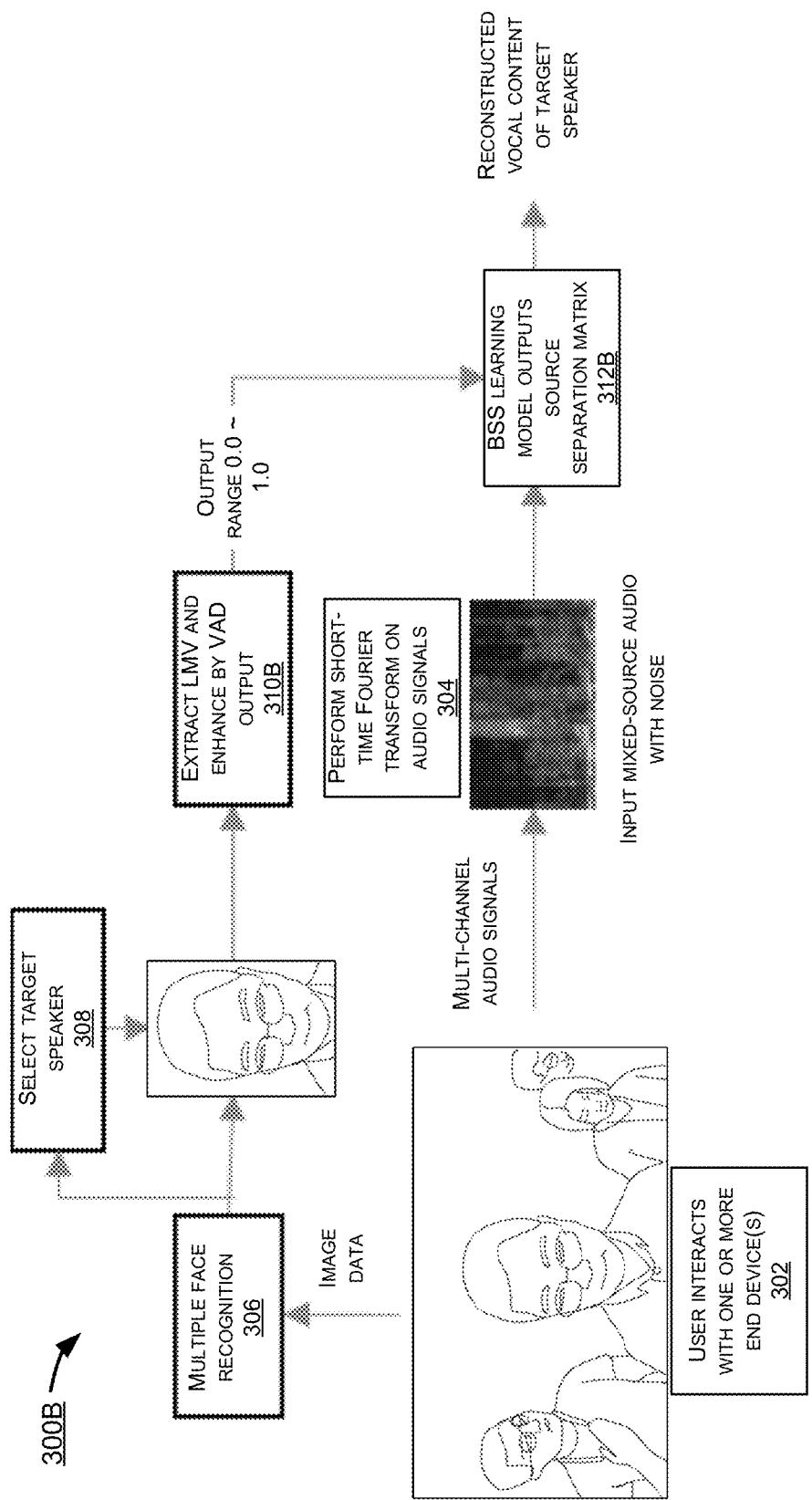

FIGS. 3A, 3B, and 3C illustrate flowcharts of preprocessing processes 300A and 300B for audio signals and target speaker facial images to be input into a learning model for single-channel source separation or multi-channel source separation computations according to example embodiments of the present disclosure.

At a step 302 of the processes 300A and 300B, a user interacts with one or more end devices including at least one audio capture device and at least one video capture device. For example, the user may perform a transaction at a self-service kiosk having at least one microphone and at least one camera installed therein. In interacting with the one or more end devices, the user may speak various instructions, commands, requests, responses, information, and such vocal content to at least one audio capture device of the one or more end devices, such as one or more microphones of a self-service kiosk, any number of microphones of nearby self-service kiosks, or a microphone of a mobile device of the user, the mobile device interacting with a self-service kiosk through initiating a communication protocol between the mobile device and the self-service kiosk by, for example, a short-range communication protocol. Moreover, the user may speak the above-mentioned vocal content while facing one or more image capture devices, such as one or more cameras of a self-service kiosk, or a camera of a mobile device of the user, the mobile device interacting with the self-service kiosk through initiating a communication protocol between the mobile device and the self-service kiosk by, for example, a short-range communication protocol.

The at least one audio capture device may capture audio during a period of interactions by the user with the one or more end devices as audio signals. The span of time of this period of interactions shall be subsequently referred to as the "period of interest," for brevity. The captured audio signals may include the vocal content spoken by the user as described above. The captured audio signals may further include speech of persons other than the user. The captured audio signals may further include ambient noise, interference, and sound from otherwise unrelated sources. According to example embodiments of the present disclosure, an objective of source separation computations may be to separate the vocal content spoken by the user as described above, subsequently designated as the "target speaker," from other such audio captured. The audio of the audio signals may be captured by the at least one audio capture device in a raw audio format, and may be converted into a compressed format by application of a transform operation, such as STFT, which transformed audio signals from time-domain representations into frequency-domain representations thereof, and then stores the audio signals in time-frequency representations thereof.

The at least one image capture device may capture image data during the period of interest with the one or more end devices as still images, a video, and/or facial images. The captured image data may include facial images and facial motions of the user while the user speaks the vocal content as described above. The captured image data may further include the user's body, faces and bodies of persons other than the user, unrelated objects in the background, and background settings of the surrounding area. The still images, video, and/or facial images may be captured by the at least one image capture device in a raw image format, and may be converted into a compressed format by an encoding mode of a codec which transforms captured images into frequency domain representations thereof.

According to example embodiments of the present disclosure, audio capture devices and image capture devices may each be connected by a data bus connection, optical data connection, or other connection suitable for transmission of audio signals and image data, respectively, with a computing device operative to perform audio preprocessing and image preprocessing, respectively, or may be connected by a wired or wireless network connection with such a computing device. For example, a computing device may be a personal mobile device, a cluster of computing systems, a server of a cloud computing system such as an edge server, an embedded computing system of an end device such as a self-service kiosk, and the like. Examples of computing devices according to example embodiments of the present disclosure may further be operative to perform subsequent source separation computations using the image dataset, depending on respective computing capacity. In example embodiments of the present disclosure where a computing device, such as an end device, is not sufficiently powerful to perform source separation computations, the computing device may further be connected by suitable connections, such as wired or wireless network connections, to additional computing devices operative to perform source separation computations, such as a remote computing host. In any case, at least each step of the process 300 may be performed by a remote computing host as described herein.

However, in general, whereas preprocessing steps of the process 300A or 300B preceding step 306 may be performed at end devices or may be performed by general-purpose processor(s) 202 of remote computing hosts as described above, steps of the process 300A or 300B subsequent to preprocessing (that is, any step following step 304) may be performed by special-purpose processor(s) 204 of remote computing hosts as described above. It should be understood that subsequent to step 304, captured audio signals and image data and/or extracted target speaker facial images may be transported from any other processors where they have undergone preprocessing, such as general-purpose processor(s) 202, to special-purpose processor(s) 204; at the special-purpose processor(s) 204, features may be extracted from the captured audio signals and image data and/or target speaker facial images, and computing of the extracted features may be performed by executing one or more learning models according to example embodiments of the present disclosure.

At a step 304 of the process 300A or 300B, short-time Fourier transform ("STFT") is performed on captured audio signals.

In general, performance of STFT on audio signals may cause the audio signals to be divided, over the time domain representation thereof, into discrete frames having some overlap, whereupon STFT may be performed on each time-domain frame to output a time-frequency representation of magnitude of audio signals of that time-domain frame.

After preprocessing by STFT, time-frequency representations of the audio signals may be separable into bands and sub-bands thereof, each band and sub-bands thereof representing particular frequencies of the audio signals. Frequency domain representations of audio data may be referenced by parameters k indicating a particular band or sub-band thereof, and t representing a particular frame thereof.

In the process 300A, the time-frequency representations of the audio signals may provide time-frequency representations of single-channel audio signals. That is, the audio signals occurring over the period of interest have only been captured from one point. In the process 300B, the time-frequency representations of the audio signals may provide time-frequency representations of multi-channel audio signals. That is, the audio signals occurring over the period of interest have been captured from multiple points. Moreover, configuration of the multiple audio capture devices which captured the audio signals at each different point relative to each other in physical space may also be known.

At a step 306 of the process 300A or 300B, a facial recognition learning model performs multiple face recognition on captured image data.

According to example embodiments of the present disclosure, prior to step 306, the captured image data has been preprocessed while converted into a frequency domain representation thereof, and has been encoded into a compressed format. Details thereof need not be elaborated upon for the purpose of understanding example embodiments of the present disclosure.

The facial recognition learning model may be any learning model trained having a parameter set for computation of multiple facial recognition techniques as known in the art. Computation of multiple facial recognition tasks on captured image data according to example embodiments of the present disclosure may yield detection of one or more faces in one or more still image or video frame of the captured image data. The one or more faces may be detected over different viewing angles from a perspective of the image capture device, depending on a field of vision of the image capture device. For example, as illustrated by FIG. 1, viewing angles may range from 30° for faces detected over at least the rightmost pixels of the still image, video frame, and/or facial image, to 150° for faces detected over at least the leftmost pixels of the still image, video frame, and/or facial image, with 90° defined as directly in front of the image capture device (assuming the image capture device has a field of view of approximately 120°). One of the faces detected therefrom may be designated as a target speaker for the purpose of designating an objective for source separation computation. In particular, a face detected over a range of angles including a frontal angle from the image capture device (for example, a range of angles encompassing a 90° angle) may be designated as a target speaker. Alternately, a face detected over a range of angles closest to a frontal angle from the image capture device may be designated as a target speaker. Moreover, a detected face may be designated as a target speaker based on orientation of the face from the image capture device; for example, a face designated as a target speaker may be a face oriented head-on to the image capture device.

Depending on configurations of image capture devices according to the needs of various practical applications, of course, a detected face designated as a target speaker need not be a face detected at a frontal angle, but may be, for example, a lateral angle or any particular angle between a frontal angle and a lateral angle. Moreover, a face designated as a target speaker may be a face oriented at quarter profile to, or at profile to, the image capture device rather than head-on. Such designations may be determined based on knowledge regarding how one or more end devices, such as image capture devices, are physically configured relative to users. However, according to example embodiments of the present disclosure pertaining to self-service kiosks as described above, it is expected that in at least approximately 85% of all cases, a face detected at a frontal angle oriented head-on to the image capture device may be correctly designated as the target speaker.

For purposes of example embodiments of the present disclosure, facial images that are detected from captured image data need not be recognized—that is, the facial images need not be classified to match any labeled speaker in any training dataset or other dataset. Facial images that are detected need only be distinguished from other facial images from the captured image data. However, the facial images may further be classified to match a labeled speaker based on, for example, customer data previously acquired by an operator of self-service kiosks as described above, so as to identify an established customer conducting a transaction in order to authenticate the customer and facilitate the transaction in real time.

At a step 308 of the process 300A or 300B, a facial recognition learning model selects a target speaker detected from the captured image data.

A portion of a still image or video frame containing the detected face of the target speaker may be selected from the captured image data as a target speaker facial image. Multiple face recognition learning models according to example embodiments of the present disclosure may track a detected face throughout a sequence of still images or a video stream captured over a period of interest, so as to track a face of a target speaker during a period of time when the speaker is known or inferred to be interacting with one or more end devices. Subsequent steps of the process 300A or 300B, in referring to a "facial image," may refer to one or more facial images of the target speaker throughout video data captured over a period of interest.

Steps 306 and 308 may be performed after step 302 but independent of ordering relative to step 304, and either or both of steps 306 and 308 may be performed concurrently to step 304, before step 304, or after step 304. Steps 306 and 308 may be performed on a processor, such as a special-purpose processor 204, different than an end device or processor(s) performing step 302, or may be performed on a same end device or processor(s) performing step 302 on one or more different cores thereof in parallel with performance of step 302.

At a step 310A of the process 300A or a step 310B of the process 300B, facial features are extracted from one or more facial images of the selected target speaker and a motion vector is computed based on the extracted features.

Figure 4A:
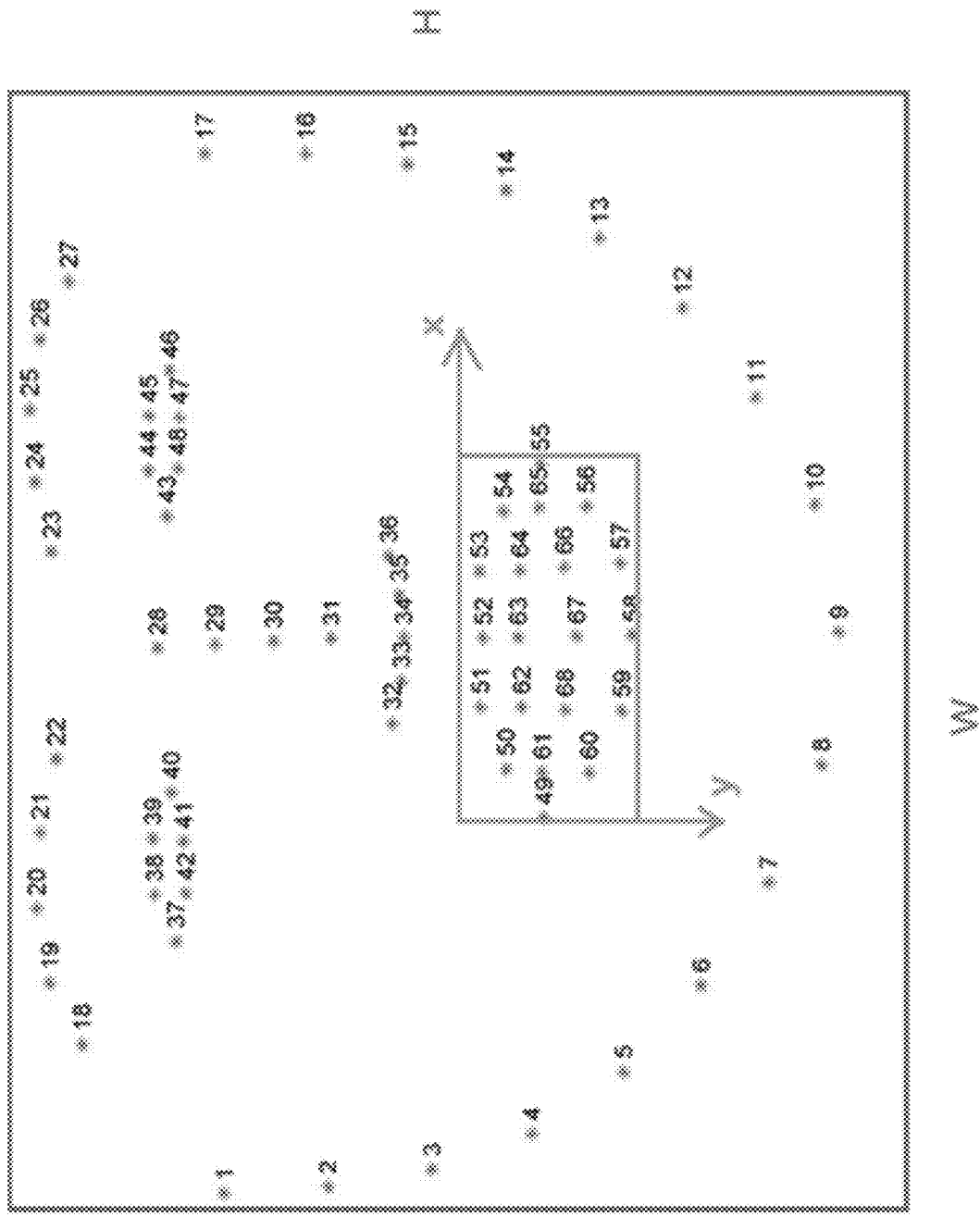
FIGS. 4A and 4B illustrate examples of sample pixels extracted from image data of facial images corresponding to, for example, eye features, nose features, and mouth features.
Figure 4B:
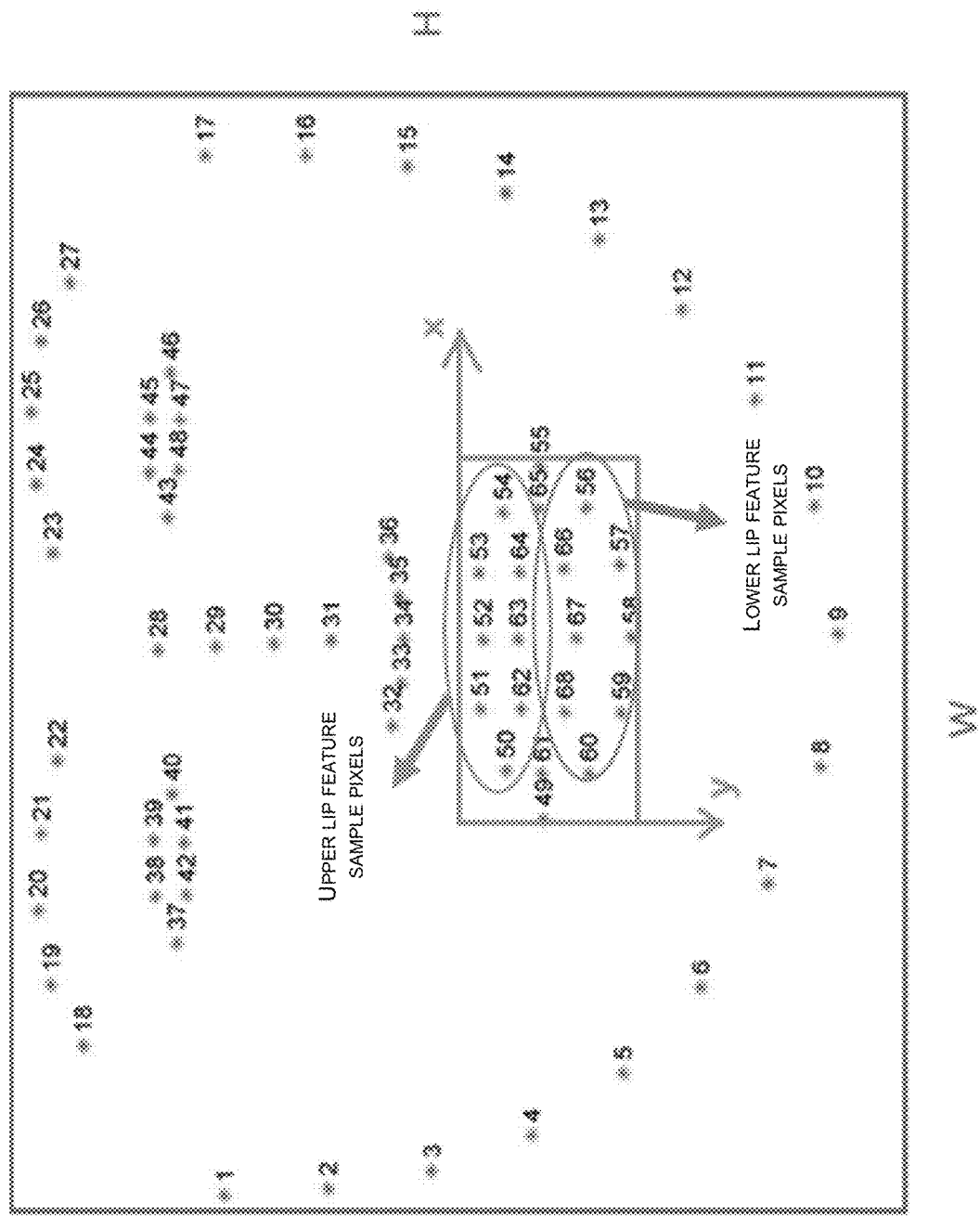

Though step 310A and step 310B may both result in extraction of facial features from the one or more facial images, step 310A may be performed according to single-channel source separation example embodiments of the present disclosure, and step 310B may be performed according to multi-channel source separation example embodiments of the present disclosure. In general, according to both step 310A and 310B, a learning model trained on labeled facial image datasets may localize certain labeled features of human faces in general to the facial images of the selected target speaker, and extract sample pixels from image data of the facial images corresponding to each of the labeled features. For example, sample pixels may correspond to eye features, nose features, or mouth features as labeled in training datasets used to train parameters of the learning model. FIGS. 4A and 4B illustrate examples of sample pixels extracted from image data of facial images corresponding to, for example, eye features, nose features, and mouth features. Moreover, according to example embodiments of the present disclosure, training datasets may be manually labeled in particular to call out lip features so that a learning model trained on the labeled facial image datasets may extract lip features with particular accuracy. Further details of FIGS. 4A and 4B shall be described henceforth with reference to steps 310A and 310B.

According to step 310A, LLD vectors, a novel type of motion vector which describes lip motion according to example embodiments of the present disclosure, may further be extracted from the mouth features (or lip features, in particular) as follows; optical flow vectors ("OPFW vectors"), motion vectors tracking motion of objects through images as known in the art, may further be extracted from the mouth features (or lip features, in particular) based on dislocations of sampled features across image data over time, by techniques known in the art. Among all of the extracted features, the sample pixels corresponding to the mouth features (or lip features in particular, in cases where the training dataset labels lip features apart from mouth features) are selected. Let the number of selected sample pixels be N. For example, as illustrated by FIG. 4A, N=20 (as sample pixels 49 through 68 correspond to lip features).

A local coordinate system may be established as illustrated by FIG. 4A, wherein a (0, 0) coordinate of an x-axis and a y-axis is established at an upper-left extremity of a cluster of sample pixels corresponding to a mouth feature (or a lip feature in particular), and across the period of interest, at each time t each sample pixel may have a first displacement in the x-axis direction and a second displacement in the y-axis direction. For an ith sample pixel out of N sample pixels, the component of the pixel's x-axis displacement may be written as $V_{xi}$, and the component of the pixel's y-axis displacement may be written as $V_{yi}$. Thus, displacements of all sample pixels out of N sample pixels corresponding to a mouth feature (or a lip feature, in particular) may be written as $V_{x0}$, $V_{x1}$, . . . , $V_{x(N-1)}$ for x-axis displacements and $V_{y0}$, $V_{y1}$, . . . , $V_{y(N-1)}$ for y-axis displacements.

Based on these displacements, each sample pixel's normalized displacement vector $\Delta V_i(t)$ may be computed as follows, where H(t) and W(t) are, respectively, height (over the vy-axis) and width (over the x-axis) of the face of the target speaker in a captured image from time t. Thus, the displacement vectors may be normalized to account for visual foreshortening of facial features of the face of the target speaker due to slight differences in orientation over time.

$$\Delta V_i(t) = \sqrt{\left(\frac{V_{xi}(t)}{W(t)}\right)^2 + \left(\frac{V_{yi}(t)}{H(t)}\right)^2}$$

Over all normalized displacement vectors for sample pixels corresponding to a mouth feature (or a lip feature, in particular), a LLD motion vector describing lip motion of the face of the target speaker at time t may be derived as the following vector:

$$\Delta V(t)=[\Delta V_0(t),\Delta V_1(t), \ldots ,\Delta V_{N-1}(t)]^T$$

Alternately, according to step 310B, a lip motion vector ("LMV") may further be extracted from the mouth features (or lip features, in particular) and augmented by VAD output according to the following sub-steps, as illustrated in FIG. 3C.

At a step 3101B, the sample pixels corresponding to the mouth features (or lip features in particular, in cases where the training dataset labels lip features apart from mouth features) are selected (i.e., among all of the extracted features). Let the number of selected sample pixels be K. For example, as illustrated by FIG. 4B, K=20 (as sample pixels 49 through 68 correspond to lip features).

In capturing images of a user's mouth speaking, it is expected that the user's upper lip and lower lip may be captured moving approximately vertically symmetrically to each other. Thus, it is expected that at least some sampled pixels corresponding to mouth features (or lip features, in particular) may be separated into sampled pixels from an upper lip and sampled pixels from a lower lip, where pairs of sampled pixels respectively from the upper lip and from the lower lip may be paired in vertically symmetrical motion.

At a step 3102B, a lip motion vector ("LMV") is computed from the selected sample pixels.

A local coordinate system may be established as illustrated by FIG. 4B, wherein a (0, 0) coordinate of an x-axis and a y-axis is established at an upper-left extremity of a cluster of sample pixels corresponding to a mouth feature (or a lip feature in particular). A first motion vector $P_1$ may represent motion of pixels corresponding to the upper lip, and may be written as $P_1=[p_{1,0}, p_{1,1}, \ldots, p_{1,K-2}]^T$; a second motion vector $P_2$ may represent motion of all corresponding to the lower lip, and may be written as $P_2=[p_{2,0}, p_{2,1}, \ldots, p_{2,K-2}]^T$. Each p may represent two-dimensional coordinates of one of the sample pixels corresponding to the mouth features (or lip features in particular), and $p_{1,k}$ and $p_{2,k}$ may denote a symmetrical pair of sample pixels.

Given these two vectors, distance therebetween may be expressed as a vector d of Euclidean distances between each pair of sample pixels, each of which, individually, may be written as:

$$d_k=\|p_{1,k}-p_{2,k}\|_2$$

Thus, the overall vector d may be written as:

$$d=[d_0,d_1, \ldots ,d_{K-2}]^T$$

A motion vector $\Delta m_t$ describing lip motion during a time t, which occurs during the period of interest T (t=0, 1, 2, . . . , T−1) may therefore be computed as:

$$\Delta m_t=d_t-d_{t-1}$$

Additionally, an aspect ratio for each time t may be computed as:

$$\alpha_t=d_t^{(v)}/W_t$$

Where $d_t^{(v)}$ represents a vertical distance vector of d at half height (compensating for the upper lip and the lower lip each being K/2 of the sample pixels), and $W_t$ represents horizontal distance between a leftmost and a rightmost sample pixel of the upper and lower lips. The LMV for time t, $LMV_t$, is expressed as a vector combining the motion vector and the aspect ratio, as written below:

$$LMV_t = \left[\Delta m_t^T, a_t^T\right]^T \in R^{\left(\left(\frac{3K}{2}-1\right)\times 1\right)}.$$

At a step 3103B, the LMV is normalized across time.

For example, the LMV may be normalized based on height (over the y-axis) and width (over the x-axis) of the face of the target speaker in a captured image from time t. Let height of the detected face be $F_h$ and width of the detected face be $F_w$. The normalized LMV for time t, $\overline{LMV}_t$, is then expressed as follows:

$$\overline{LMV}_t=[\Delta m_t^T/\sqrt{F_w F_h},\alpha_t^T]^T$$

The L2 norm of the normalized LMV $\overline{LMV}_t$ may then be solved to determine the Euclidean distance of the vector from the origin (0, 0) of the vector space as defined above ($\theta_{LMV}$), as below:

$$\ominus_{LMV,t} = \sqrt{\sum_{k=0}^{3K/2-2} \overline{LMV}_t^2(k)}$$

At a step 3104B, a hidden Markov model ("HMM") outputs a probability of speech based on the normalized LMV.

Generally, an HMM may be a statistical learning model which observes states and computes a probability, given a statistical distribution (such as a Gaussian distribution). The HMM may compute a distribution of the Euclidean distance of the normalized LMV, and predict probability of speech based thereon. According to example embodiments of the present disclosure, an HMM may observed states of $\theta_{LMV,t-1}$ and compute a probability that $\theta_{LMV,t}$ has a particular state. States of $\theta_{LMV,t}$ according to example embodiments of the present disclosure may indicate, for example, that the upper lips and lower lips are open, or that the upper lips and lower lips are closed. Thus, prediction of a state of $\theta_{LMV,t}$ may correlate to a probability that speech is detected, or not detected.

At a step 3105B, a VAD outputs a detection result based on the HMM output.

The HMM may further be a component of a VAD as described above. Since a VAD is expected to output a value that is either 0 or 1, probability outputs of the HMM may be mapped over a range of 0 to 1 as follows:

$$P_{vad,t}=HMM(\theta_{LMV,t-1}), P_{vad,t} \in [0,1]$$

Here, a $P_{vad,tv}$ value approaching 1 indicates that speech at time t is detected by the VAD, and a $P_{vad,t}$ approach 0 indicates that speech at time t is not detected by the VAD. However, $P_{vad,t}$ is expected to be a noisy probability, and according to example embodiments of the present disclosure $P_{vad,t}$ may be further post-processed to reduce false positives and improve detection rate. Smoothing of $P_{vad,t}$ may be performed as follows, returning $P'_{vad,t}$:

$$P_{vad,t}' = \beta \cdot P_{vad,t-1}' + (1-\beta) \cdot P_{vad,t}$$

At a step 312A of the process 300A or at a step 312B of the process 300B, a source separation learning model, based on at least the computed motion vector, separates audio corresponding to at least one constituent source from the captured audio signal.

As previously discussed, an objective of the source separation learning model's computation may be to separate vocal content spoken by a target speaker from other such audio captured, and context regarding the target speaker and timing of speech by the target speaker may serve to enhance computations by the source separation learning model. According to example embodiments of the present disclosure, motion vectors computed based on steps 310A or 310B may be deemed to represent motions of the target user's lips during the period of interest while the target speaker is presumed to be speaking the vocal content, and thus information represented by the motion vectors, as well as results of additional computations based on the motion vectors (such as the output of the VAD according to step 310B) may serve to enhance computations by the source separation learning model.

Though step 312A and step 312B may both result in outputting audio corresponding to at least one constituent source from the captured audio signal, where it is desirable for the constituent source to be the target speaker as consistently as possible, step 312A may be performed according to single-channel source separation example embodiments of the present disclosure, and step 312B may be performed according to multi-channel source separation example embodiments of the present disclosure. In general, according to both step 312A and 312B, a source separation learning model may be a learning model trained on audio signals containing labeled vocal content. However, techniques performed by the learning models may differ, as described in further detail below.

According to step 312A, a source separation learning model outputs a target mask and a noise mask. As described above, a mask may be a matrix or vector in the frequency domain which, when applied to a time-frequency representation of mixed-source audio signals by an operation (such as a multiplication operation against each frame), yields at least one of the constituent sources of the captured audio signal. In particular, a target mask may be a mask which yields an objective constituent source of the mixed-source single-channel audio signal which is, according to example embodiments of the present disclosure, a target speaker. A noise mask may be a mask which at least reduces constituent audio of the mixed-source single-channel audio signal which does not correspond to any source, or does not correspond to the objective source. A time-frequency representation of an audio signal having a mask applied thereto may then be transformed by inverse STFT to reconstruct a time-domain representation of the audio signal which yields vocal content spoken by the target speaker.

According to step 312A, a source separation learning model may be a fusion learning model wherein multiple learning sub-models are joined, wherein outputs of some learning models are connected to inputs of other learning models. The architecture of such a fusion learning model is illustrated in brief in FIG. 3A, while FIG. 5 illustrates details of a fusion learning model 500 according to example embodiments of the present disclosure.

Generally, the learning sub-models according to example embodiments of the present disclosure may have any number of layers.

Figure 5:
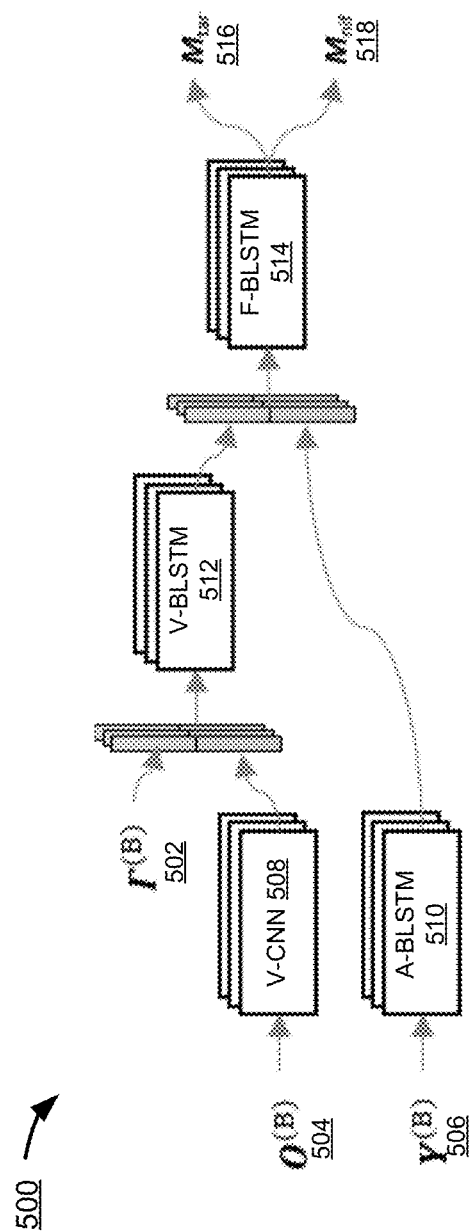
FIG. 5 illustrates details of a fusion learning model according to example embodiments of the present disclosure.

As illustrated in FIG. 5, the fusion learning model 500 takes at least three inputs: LLD vectors 502 extracted according to step 310A; OPFW vectors 504 extracted according to step 310A; and single-channel audio signals 506 (carrying noise and interference) as captured as described above. Below, B denotes batch size of a batch of any of these types of data; T denotes duration of a training sample from training datasets; and F denotes frequency bands of a time-frequency representation of the audio signals. Thus, LLD vectors 502 may be written as $\Gamma^{(B)}$.

$$\Gamma^{(B)} \in R^{(B \times T \times (K-2))}$$

Where K is the number of sample pixels corresponding to mouth features (or lip features, in particular) as described above.

OPFW vectors 504 may be written as $O^{(B)}$.

$$O^{(B)} \in R^{(B \times T \times W \times H \times 2)}$$

Where H and W are, respectively, height (over the y-axis) and width (over the x-axis) of the face of the target speaker in a captured image.

Single-channel audio signals 506 may be written as $Y^{(B)}$. Furthermore, cleaned audio signals to be derived from smoothing the noisy audio signals may be denoted as $X^{(B)}$, and the noise and interference to be removed may be denoted as $N^{(B)}$.

$$Y^{(B)}, X^{(B)}, N^{(B)} \in C^{(B \times T \times F)}$$

As mentioned above, step 312A may cause the source separation learning model to output a target mask and a noise mask, which may be, respectively, two-dimensional matrices. The target mask may be denoted as $\hat{M}_{tar}^{(B)}$ 516. The noise mask may be denoted as $\hat{M}_{nif}^{(B)}$ 518.

$$\hat{M}_{tar}^{(B)}, \hat{M}_{nif}^{(B)} \in R^{(B \times T \times F)}$$

As illustrated in FIG. 5, first, $O^{(B)}$ 504 is input into a V-CNN 508, and $Y^{(B)}$ 506 is input into an A-BLSTM 510.

As generally known in the art, coarse-to-fine feature recognition generally utilizes learning models such as a V-CNN 508 to recognize, from coarser features extracted from image data during initial scans and classification of images, finer features which may be utilized in more granular feature classification computations. Thus, the V-CNN 508 may compute $O^{(B)}$ 504 to recognize finer motion vectors from the motion vectors included in $O^{(B)}$ 504.

As generally known in the art, BLSTM learning models, by processing input signals both forward and backward, may utilize contextual information from audio signals later in time to perform computations on audio signals earlier in time, and vice versa. Thus, though output of the A-BLSTM 510 does not connect to the final output of the fusion learning model, the A-BLSTM 510 may perform computations which output intermediate outputs which partially, but do not fully, accomplish the goals of the target mask and the noise mask.

Motion vectors output by the V-CNN 508 may be fused with $\Gamma^{(B)}$ 502 to yield, for example, first-order fused motion vectors including both the features of motion vectors output by the V-CNN 508 and the features of $\Gamma^{(B)}$ 502 (that is, the features of the LDD lip motion vectors). The resulting first-order fused motion vectors may contain information regarding the motion of lips of the target speaker over time, having improved granularity with regard to motion.

As illustrated in FIG. 5, then, the first-order fused motion vectors are input into a V-BLSTM 512.

Similar to the A-BLSTM 510 process as described above, the V-BLSTM 512 may utilize information from motion vectors later in time to perform computations on motion vectors earlier in time, and vice versa. Thus, though output of the V-BLSTM 512 does not connect to the final output of the fusion learning model, the V-BLSTM 512 may perform computations which output intermediate outputs, such as first-order fused motion vectors where motion features over a period of time are made more consistent based on context between motion features earlier in time and motion vectors later in time.

As illustrated in FIG. 5, then, audio signals output by the A-BLSTM 510 may be fused with first-order fused motion vectors to yield, for example, second-order fused motion and audio vectors including the features of motion vectors output by the V-CNN 508, the features of $\Gamma^{(B)}$ 502 (that is, the features of the LDD lip motion vectors), and the features of audio signals output by the A-BLSTM 510. The resulting second-order fused motion and audio vectors may contain information regarding the motion of lips of the target speaker over time and corresponding audio signals captured over the same time.

As illustrated in FIG. 5, next, the second-order fused motion and audio vectors are input into a F-BLSTM 514.

Unlike the A-BLSTM 510 and V-BLSTM 512 processes as described above, the F-BLSTM 514 may utilize the information regarding the motion of lips of the target speaker over time to enhance source separation computations. The fusion of these two categories of information in same feature vectors, indexed by time, may enable the F-BLSTM 514 receiving the second-order fused motion and audio vectors to access both motion features of lips of a target speaker and mixed-source audio features for a same time t, such that the F-BLSTM 514 may determine, for example, that the lips of the target speaker are likely or unlikely to be speaking at time t; such determinations assist in determining whether speech of the target speaker is likely to be found in the audio signals at the same time t, thus facilitating source separation computations according to example embodiments of the present disclosure.

Source separation computations performed by the F-BLSTM 514 may be based on minimizing output of a cost function J by performing gradient descent computations. It is known in the art that a cost function may be any arbitrarily defined function based on output of the learning model, where output of the cost function represents degree of error in the output. Thus, for the F-BLSTM 514 outputting a target mask and a noise mask, the cost function may be defined to yield greater outputs for target masks which less accurately yield an objective vocal content spoken by the target speaker, and may also be defined to yield greater output for noise masks which yield an audio signal having more noise and interference remaining.

According to example embodiments of the present disclosure, gradient descent computations may seek to minimize output of a cost function J for both the target mask and the noise mask at the same time. Thus, a cost function J according to example embodiments of the present disclosure may, for example, be as follows:

$$J = \frac{1}{B \times T \times F}\left(\left\|\hat{M}_{tar}^{(B)} \odot |Y^{(B)}| - |X^{(B)}| \odot \cos(\angle Y^{(B)} - \angle X^{(B)})\right\|_F^2 + \left\|\hat{M}_{nif}^{(B)} \odot |Y^{(B)}| - |X^{(B)}| \odot \cos(\angle Y^{(B)} - \angle N^{(B)})\right\|_F^2\right)$$

Where $\angle \bullet$, $|\bullet|$ $\|\bullet\|_F$ denote, respectively, phase of a signal; amplitude of a signal; and the Frobenius norm, a two-dimensional matrix norm, in the vector space, and $\odot$ denotes the dot product operation between two-dimensional matrices. Applying the Frobenius norm to the cost function may normalize the cost function over each of batch size B; training sample duration T; and frequency band F.

A target mask $\hat{M}_{tar}^{(B)}$ 516 and a noise mask $\hat{M}_{nif}^{(B)}$ 518 of which coefficients are output by the F-BLSTM may be applied to the single-channel audio signal $Y^{(B)}$ 506 to separate speech of the target speaker, and smooth noisy audio signals, by the following operations:

$$\hat{X}^{(B)} = \hat{M}_{tar}^{(B)} \odot Y^{(B)}$$

$$\hat{N}^{(B)} = \hat{M}_{nif}^{(B)} \odot Y^{(B)}$$

According to a step 314A as illustrated by FIG. 3A, differences between errors output by the cost function J from the output of step 312A and errors output by the cost function J from labeled training data may be fed back to the fusion learning model to adjust the parameters until the errors are minimized by gradient descent.

Subsequently, after the cost function has been minimized, a target mask and a noise mask output by the fusion learning model may be applied to the single-channel audio signal, and the resultant product may then be transformed by inverse STFT to reconstruct a time-domain representation of the audio signal which yields vocal content spoken by the target speaker.

Alternately, according to step 312B, a blind source separation ("BSS") learning model outputs a demixing matrix. Similar to a mask as described above, a demixing matrix W(k, t) may be a matrix in the frequency domain which, when applied to a time-frequency representation of mixed-source multi-channel audio signals by an operation (such as a multiplication operation against each frame), yields an objective constituent source of the mixed-source multi-channel audio signal which is, according to example embodiments of the present disclosure, a target speaker. A time-frequency representation of an audio signal having a mask applied thereto may then be transformed by inverse STFT to reconstruct a time-domain representation of the audio signal which yields vocal content spoken by the target speaker.

In other words:

$$Y(k,t) = W(k,t)X(k,t)$$

Wherein Y(k, t) is a post-source separation audio signal, and X(k, t) is the captured multi-channel audio signal in a time-frequency representation.

According to example embodiments of the present disclosure, the VAD as described in step 3105B above, wherein outputs of the VAD are enhanced by an HMM based on LMVs (subsequently described as a "lip motion VAD" for brevity), may be utilized in supervised BSS computation by the BSS learning model. Supervised BSS computation based on independent vector analysis ("IVA") techniques may be those known to persons skilled in the art. However, according to example embodiments of the present disclosure, equations for supervised computation may be used based on the VAD output as supervision data, as described below.

Thus, the supervised BSS computation algorithm may be modified for the purposes of example embodiments of the present disclosure so as to substitute the VAD output as described above as supervision data.

X(k, t) for the purpose of example embodiments of the present disclosure may be described as:

$$X(k,t)=H(k,t)S(k,t)+N(k,t)$$

Where M further designates the number of channels of the multi-channel audio signals of X(k, t); S(k, t) is composed of N constituent source signals included in X(k, t); H(k, t) is a mixing matrix, an M×N matrix which, when multiplied with S(k, t), yields a mixed-source matrix representing multi-source signals; and N(k, t) is noise signals also composed of M channels.

A mixing matrix should be understood as a mathematical construct which may represent the inverse of a demixing matrix W(k, t).

Moreover, in the statement Y(k, t)=W(k, t)X(k, t), Y(k, t) may include one or more separated constituent signals, where an nth constituent signal is designated $Y_n(k, t)$; and the audio signal of the mth channel making up the multi-channel audio signals of X(k, t) is designated $X_m(k, t)$. Given an estimated demixing matrix W(k, t), W may have M columns and N rows, where based on m and n, an element $W_{nm}(k, t)$ may be located at the mth column and nth row.

The supervised BSS computation algorithm may be performed by the following iterative steps:

In a first iteration:

$$Y(k,t)=W(k,t)X(k,t)$$

In a second iteration:

$$\Delta W_{nm}(k,t)=(I_{nm}-\phi(k,t)Y_n(k,t)Y_m(k,t)^*)W_{nm}(k,t)$$

In a third iteration:

$$W(k,t+1)=W(k,t)+\eta\Delta W(k,t)$$

The supervised BSS computation algorithm requires supervision data $\phi(k, t)$. According to example embodiments of the present disclosure, $\phi(k, t)$ may be derived from the above-derived smoothed VAD output $P_{vad,t}'$ from step 3105B by the following:

$$\phi(k, t) = \frac{1}{\sqrt{\sum_{k=0}^{K-1}|Y_n(k, t)|^2 + (\gamma P'_{vad,t}/M)\sum_{m=0}^{M-1}\sum_{k=0}^{K-1}|X_m(k, t)|^2}}$$

γ is a contribution ratio coefficient which may determine an extent to which the VAD output contributes to the supervised BSS computation. Suppose that the nth constituent signal $Y_n(k, t)$ has the target speaker as its source; then, the VAD output may be relevant to the BSS computation, and γ may have a non-zero value. However, suppose that the jth constituent signal $Y_j(k, t)$, where j≠n, has noise or interference as its source; then, the VAD output may be irrelevant to the supervised BSS computation, and y may have a value of zero.

Subsequently, after the supervised BSS computation is iteratively completed, the demixing matrix W may be applied to the multi-channel audio signals X to derive separated constituent audio signals Y including constituent audio signal $Y_n$ corresponding to the target speaker. $Y_n$ may then be transformed by inverse STFT to reconstruct a time-domain representation of the audio signal which yields vocal content spoken by the target speaker.

Speech recognition techniques as known to persons skilled in the art may be performed upon the vocal content spoken by the target speaker, and recognition of the vocal content may yield information which may assist in conducting the transactions performed by users at end devices, such as self-service kiosks. Particulars of speech recognition techniques as known to persons skilled in the art need not be detailed herein for understanding example embodiments of the present disclosure.

Figure 6:
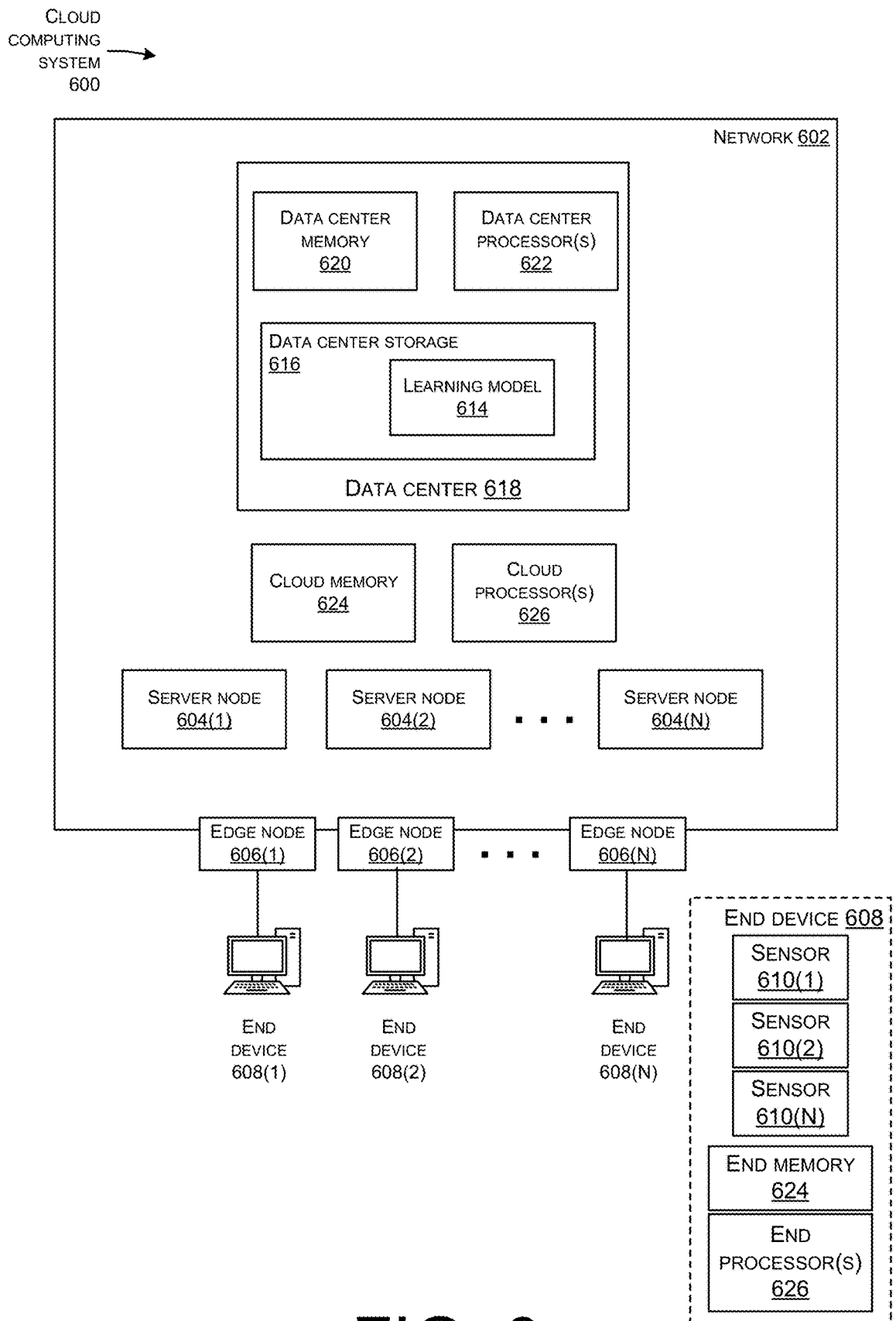
FIG. 6 illustrates an architectural diagram of a cloud computing system hosting a learning model according to example embodiments of the present disclosure.

FIG. 6 illustrates an architectural diagram of a cloud computing system 600 hosting interfaces to one or more remote computing hosts according to example embodiments of the present disclosure. As described above, while examples of computing devices according to example embodiments of the present disclosure may be operative to perform subsequent training and inference computations using the image dataset, in other cases additional computing devices, in communication by network connections, may be operative to perform training and inference computations. Thus, this figure illustrates some possible architectural embodiments of computing devices as described above.

The cloud computing system 600 may be implemented over a network 602 of physical or virtual server nodes 604(1), 604(2), . . . , 604(N) (where any unspecified server node may be referred to as a server node 604) connected by physical or virtual network connections. Furthermore, the network 602 terminates at physical or virtual edge nodes 606(1), 606(2), . . . , 606(N) (where any unspecified edge node may be referred to as an edge node 606) located at physical and/or logical edges of the network 602. The edge nodes 606(1) to 606(N) may connect to any number of end devices 608(1), 608(2), . . . , 608(N) (where any unspecified end device may be referred to as an end device 608). An end device 608, such as, by way of example, end device 608(1), may collect captured data from any number of sensors 610(1), 610(2), . . . , 610(N), where a sensor may be, for example, an audio capture device operative to collect audio signals or an image capture device operative to collect image data (such as still images, video frames, and the like).

A learning model 614 implemented on a remote computing host accessed through an interface of the cloud computing system 600 as described in example embodiments of the present disclosure may be stored on physical or virtual storage 616 of a data center 618 ("data center storage"), and may be loaded into physical or virtual memory 620 of the data center 618 ("data center memory") in order for one or more physical or virtual processor(s) 622 of the data center 618 ("data center processor(s)") to perform computations using the learning model 614 to compute input data related to computing tasks as described herein. Data center processor(s) 622 may be special-purpose computing devices facilitating computation of neural network computing tasks. For example, data center processor(s) 622 may be one or more special-purpose processor(s) 204 as described above, including accelerator(s) such as Neural Network Processing Units ("NPUs"), Graphics Processing Units ("GPUs"), Tensor Processing Units ("TPU"), and the like.

According to example embodiments of the present disclosure, audio signals and/or still images, videos, and/or facial images captured at an end device 608 may be loaded into physical or virtual memory 624 of the end devices 608 ("end memory") in order for one or more physical or virtual processor(s) 626 ("end processor(s)") of the end devices 608 to perform preprocessing operations as described above. Alternatively, audio signals and/or still images, videos, and/or facial images captured at an end device 608 may be transported to any of the edge nodes 606 and loaded into physical or virtual memory 628 of the edge nodes 606 ("edge memory") in order for one or more physical or virtual processor(s) 630 of the edge nodes 606 ("edge processor(s)") to perform preprocessing operations as described above. Alternatively, audio signals and/or still images, videos, and/or facial images captured at an end device 608 may be transported to any of the server nodes 604 and loaded into end memory 624 of the cloud computing system 600 ("cloud memory") in order for one or more end processor(s) 626 of the cloud computing system 600 ("cloud processor(s)") to perform preprocessing operations as described above.

Audio signals and/or still images, videos, and/or facial images according to embodiments of the present disclosure may be transported to one or more remote computing hosts and utilized by the data center processor(s) 622 to perform computations based on the learning model 614. According to example embodiments of the present disclosure implementing process 300A, the learning model may be a fusion learning model, wherein multiple learning sub-models are joined, wherein outputs of some learning models are connected to inputs of other learning models. Learning sub-models may be executed by different processors of the data center processor(s) 622 or may execute by a same processor of the data center processor(s) 622 on different cores or different threads, and each learning sub-model may perform computation concurrently relative to each other learning sub-model.

Figure 7:
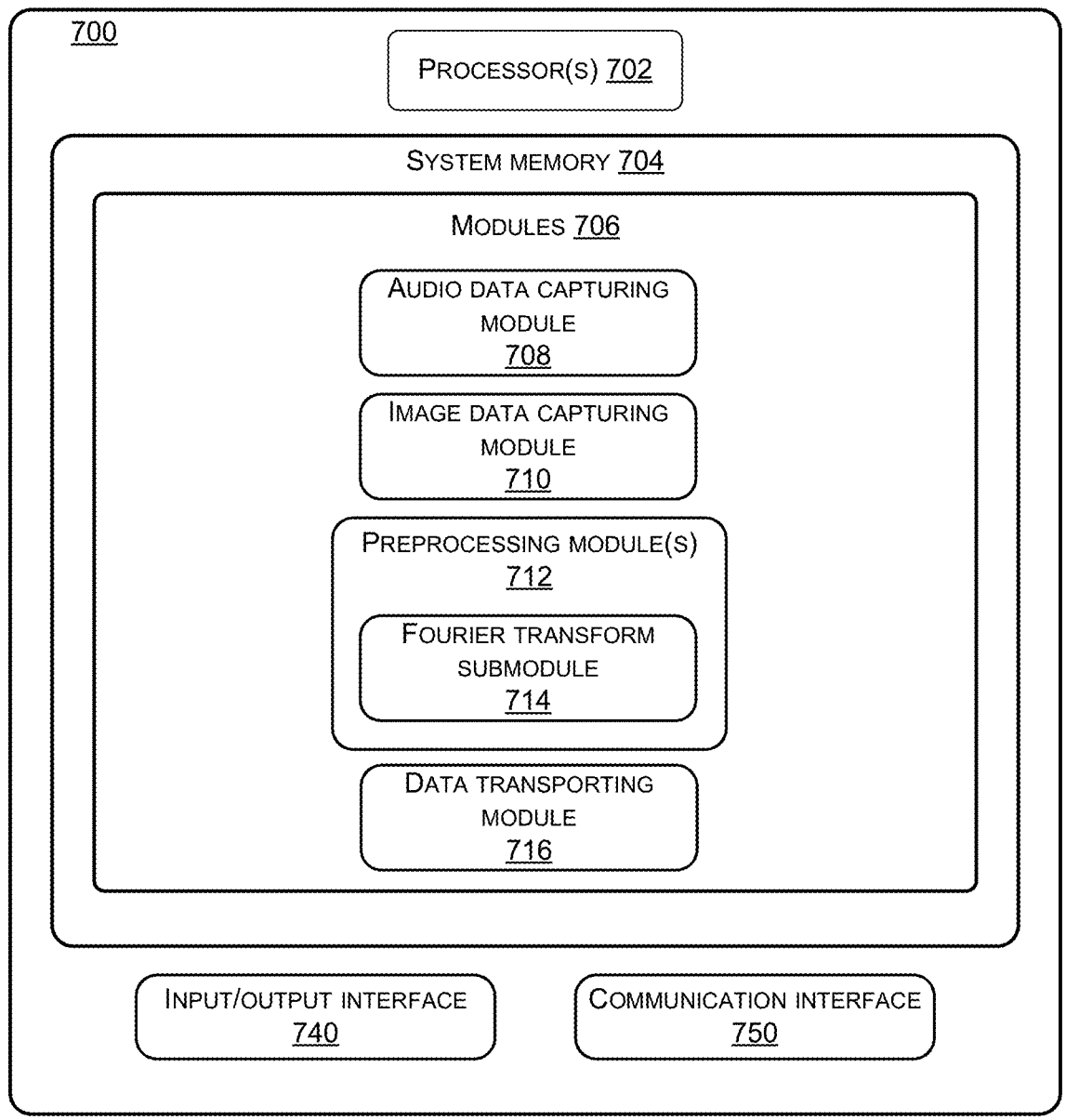
FIG. 7 illustrates an example end device system for implementing the processes and methods described above for implementing source separation techniques for learning models.

FIG. 7 illustrates an example end device system 700 for implementing the processes and methods described above for implementing source separation techniques for learning models.

The techniques and mechanisms described herein may be implemented by multiple instances of the end device system 700, as well as by any other computing device, system, and/or environment. The end device system 700 may be an end device or may be a computing system having multiple end devices installed therein, as described above: an end device may be an image capture device such as a video camera installed at a self-service kiosk, the video camera collecting still images, video, and facial image data which may originate from users of the self-service kiosk. According to another example, an end device may be an audio capture device such as a microphone installed at a self-service kiosk, the microphone collecting audio which may originate from users of the self-service kiosk. The self-service kiosk overall may be an end device system 700. The system 700 shown in FIG. 7 is only one example of a system and is not intended to suggest any limitation as to the scope of use or functionality of any computing device utilized to perform the processes and/or procedures described above. Other well-known computing devices, systems, environments and/or configurations that may be suitable for use with the embodiments include, but are not limited to, personal computers, server computers, hand-held or laptop devices, multiprocessor systems, microprocessor-based systems, set top boxes, game consoles, programmable consumer electronics, network PCs, minicomputers, mainframe computers, distributed computing environments that include any of the above systems or devices, implementations using field programmable gate arrays ("FPGAs") and application specific integrated circuits ("ASICs"), and/or the like.

The system 700 may include one or more processors 702 and system memory 704 communicatively coupled to the processor(s) 702. The processor(s) 702 and system memory 704 may be physical or may be virtualized and/or distributed. The processor(s) 702 may execute one or more modules and/or processes to cause the processor(s) 702 to perform a variety of functions. In embodiments, the processor(s) 702 may include a central processing unit ("CPU"), a GPU, an NPU, a TPU, any combinations thereof, or other processing units or components known in the art. Additionally, each of the processor(s) 702 may possess its own local memory, which also may store program modules, program data, and/or one or more operating systems.

Depending on the exact configuration and type of the system 700, the system memory 704 may be volatile, such as RAM, non-volatile, such as ROM, flash memory, miniature hard drive, memory card, and the like, or some combination thereof. The system memory 704 may include one or more computer-executable modules 706 that are executable by the processor(s) 702. The modules 706 may be hosted on a network as services for a data processing platform, which may be implemented on a separate system from the system 500.

The modules 706 may include, but are not limited to, an audio data capturing module 708, an image data capturing module 710, one or more preprocessing module(s) 712 (including a Fourier transform submodule 714), and a data transporting module 716.

The audio data capturing module 708 may be configured to capture audio during a period of interactions by the user with the one or more end devices as audio signals as described above with reference to FIGS. 3A and 3B.

The image data capturing module 710 may be configured to decode the compressed images into a frequency domain representation of the image dataset as described above with reference to FIGS. 3A and 3B.

The one or more preprocessing module(s) 712 may be configured to perform preprocessing operations on the captured audio signals, including, at least, the Fourier transform submodule 714 performing STFT on the captured audio signals, as described above with reference to FIGS. 3A and 3B.

The data transporting module 716 may be configured to transport the captured audio signals in a time-frequency representation thereof to one or more special-purpose processor(s), as described above with reference to FIGS. 2A and 2B.

The system 700 may additionally include an input/output ("I/O") interface 740 and a communication module 750 allowing the system 700 to communicate with other systems and devices over a network, such as end devices including cameras and microphones as described above. The network may include the Internet, wired media such as a wired network or direct-wired connections, and wireless media such as acoustic, radio frequency ("RF"), infrared, and other wireless media.

Figure 8A:
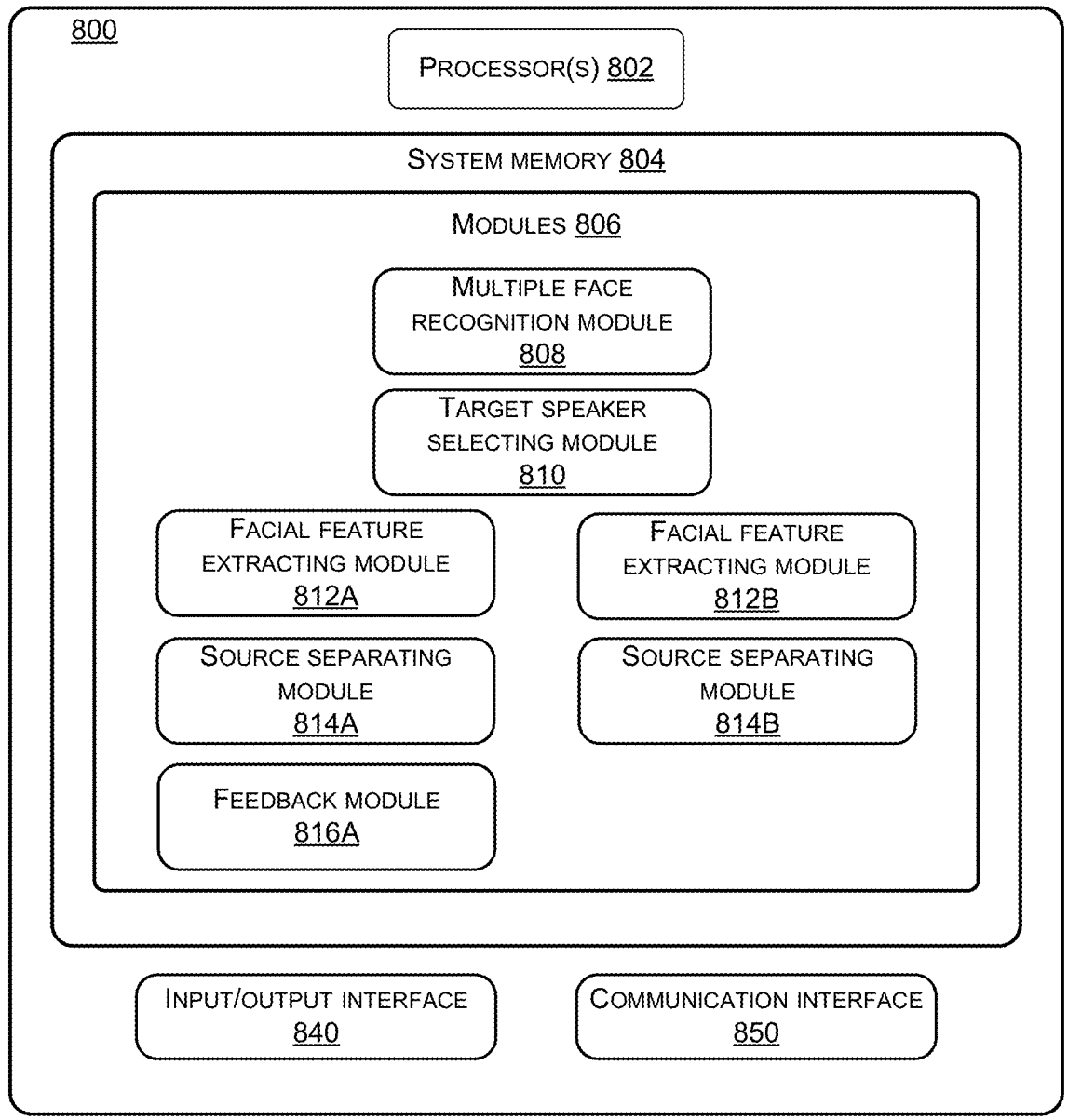
FIGS. 8A and 8B illustrate an example computing system for implementing the processes and methods described above for implementing source separation techniques for learning models.
Figure 8B:
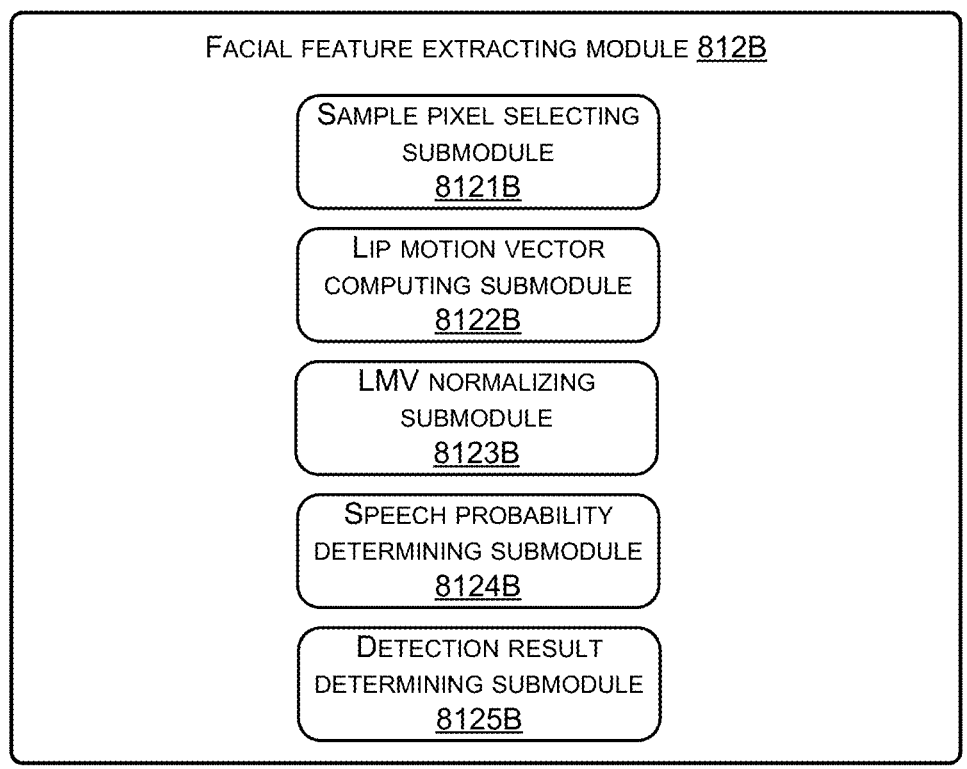

FIGS. 8A and 8B illustrate an example computing system 800 for implementing the processes and methods described above for implementing source separation techniques for learning models.

The techniques and mechanisms described herein may be implemented by multiple instances of the system 800, as well as by any other computing device, system, and/or environment. The system 800 may be a distributed system composed of multiple physically networked computers or web servers, a physical or virtual cluster, a computing cloud, or other networked computing architectures providing physical or virtual computing resources as known by persons skilled in the art. Examples thereof include learning systems such as the data center as described above with reference to FIG. 6. The system 800 shown in FIG. 8 is only one example of a system and is not intended to suggest any limitation as to the scope of use or functionality of any computing device utilized to perform the processes and/or procedures described above. Other well-known computing devices, systems, environments and/or configurations that may be suitable for use with the embodiments include, but are not limited to, personal computers, server computers, hand-held or laptop devices, multiprocessor systems, microprocessor-based systems, set top boxes, game consoles, programmable consumer electronics, network PCs, minicomputers, mainframe computers, distributed computing environments that include any of the above systems or devices, implementations using field programmable gate arrays ("FPGAs") and application specific integrated circuits ("ASICs"), and/or the like.

The system 800 may include one or more processors 802 and system memory 804 communicatively coupled to the processor(s) 802. The processor(s) 802 and system memory 804 may be physical or may be virtualized and/or distributed. The processor(s) 802 may execute one or more modules and/or processes to cause the processor(s) 802 to perform a variety of functions. In embodiments, the processor(s) 802 may include a central processing unit ("CPU"), a GPU, an NPU, a TPU, any combinations thereof, or other processing units or components known in the art. Additionally, each of the processor(s) 802 may possess its own local memory, which also may store program modules, program data, and/or one or more operating systems.

Depending on the exact configuration and type of the system 800, the system memory 804 may be volatile, such as RAM, non-volatile, such as ROM, flash memory, miniature hard drive, memory card, and the like, or some combination thereof. The system memory 804 may include one or more computer-executable modules 806 that are executable by the processor(s) 802. The modules 806 may be hosted on a network as services for a data processing platform, which may be implemented on a separate system from the system 800.

The modules 806 may include, but are not limited to, a multiple face recognition module 808, a target speaker selecting module 810, a facial feature extracting module 812A or 812B, a source separating module 814A or 814B, and optionally a feedback module 816A.

The multiple face recognition module 808 may be configured to perform multiple face recognition on captured image data as described above with reference to FIGS. 3A and 3B.

The target speaker selecting module 810 may be configured to select a target speaker detected from the captured image data as described above with reference to FIGS. 3A and 3B.

The facial feature extracting module 812A or 812B may be configured to extract facial features from one or more facial images of the selected target speaker and compute a motion vector as described above with reference to FIG. 3A or FIG. 3B. As FIG. 8B illustrates, the facial feature extracting module 812B may further include:

A sample pixel selecting submodule 8121B which may be configured to select sample pixels corresponding to mouth features or lip features as described above with reference to FIG. 3B;

A lip motion vector computing submodule 8122B which may be configured to compute a LMV from the selected sample pixels as described above with reference to FIG. 3B;

A LMV normalizing submodule 8123B which may be configured to normalize the LMV across time as described above with reference to FIG. 3B;

A speech probability determining submodule 8124B which may be configured to output, by computing by a HMM based on the normalized LMV, a probability of speech as described above with reference to FIG. 3B; and A detection result determining submodule 8125B which may be configured to output, by a VAD, a detection result based on the HMM output, as described above with reference to FIG. 3B.

The source separating module 814A or 814B may be configured to compute the captured audio signals and, based further on at least the computed motion vector, outputs audio corresponding to at least one constituent source from the captured audio signal, as described above with reference to FIGS. 3A and 3B.

The feedback module 816A may be configured to feed back differences between errors output by the cost function J from the output of the source separating module 812A and errors output by the cost function J from labeled training data to the fusion learning model to adjust the parameters until the errors are minimized by gradient descent, as described above with reference to FIG. 2A.

The system 800 may additionally include an input/output ("I/O") interface 840 and a communication module 850 allowing the system 800 to communicate with other systems and devices over a network, such as end device systems 700 as described above. The network may include the Internet, wired media such as a wired network or direct-wired connections, and wireless media such as acoustic, radio frequency ("RF"), infrared, and other wireless media.

Some or all operations of the methods described above can be performed by execution of computer-readable instructions stored on a computer-readable storage medium, as defined below. The term "computer-readable instructions" as used in the description and claims, include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

The computer-readable storage media may include volatile memory (such as random-access memory ("RAM")) and/or non-volatile memory (such as read-only memory ("ROM"), flash memory, etc.). The computer-readable storage media may also include additional removable storage and/or non-removable storage including, but not limited to, flash memory, magnetic storage, optical storage, and/or tape storage that may provide non-volatile storage of computer-readable instructions, data structures, program modules, and the like.

A non-transient computer-readable storage medium is an example of computer-readable media. Computer-readable media includes at least two types of computer-readable media, namely computer-readable storage media and communications media. Computer-readable storage media includes volatile and non-volatile, removable and non-removable media implemented in any process or technology for storage of information such as computer-readable instructions, data structures, program modules, or other data. Computer-readable storage media includes, but is not limited to, phase change memory ("PRAM"), static random-access memory ("SRAM"), dynamic random-access memory ("DRAM"), other types of random-access memory ("RAM"), read-only memory ("ROM"), electrically erasable programmable read-only memory ("EEPROM"), flash memory or other memory technology, compact disk read-only memory ("CD-ROM"), digital versatile disks ("DVD")

or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism. As defined herein, computer-readable storage media do not include communication media.

The computer-readable instructions stored on one or more non-transitory computer-readable storage media that, when executed by one or more processors, may perform operations described above with reference to FIGS. 1-8B. Generally, computer-readable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

By the abovementioned technical solutions, the present disclosure provides implementing source separation techniques, and more specifically performing source separation on mixed source single-channel and multi-channel audio signals enhanced by inputting lip motion information from captured image data. Techniques include including selecting a target speaker facial image from a plurality of facial images captured over a period of interest; computing a motion vector based on facial features of the target speaker facial image; and separating, based on at least the motion vector, audio corresponding to a constituent source from a mixed source audio signal captured over the period of interest. The mixed source audio signal may be captured from single-channel or multi-channel audio capture devices. Separating audio from the audio signal may be performed by a fusion learning model comprising a plurality of learning sub-models. Separating the audio from the audio signal may be performed by a blind source separation ("BSS") learning model. Enhancing learning models using real-time image data showing the movement of a target speaker's lips may provide significant context for enhancing the accuracy of source separation, and furthermore knowledge of audio capture device configuration in multi-channel embodiments of the present disclosure may enable face delay techniques based on respective distances of audio capture devices from a speaker to be utilized in blind source separation.

Example Clauses

A. A method comprising: selecting a target speaker facial image from a plurality of facial images captured over a period of interest; computing a motion vector based on facial features of the target speaker facial image; and separating, based on at least the motion vector, audio corresponding to a constituent source from a mixed source audio signal captured over the period of interest.

B. The method as paragraph A recites, wherein the plurality of facial images are detected in a captured image over different viewing angles from a perspective of an image capture device, and the target speaker facial image is detected over a range of angles closest to a frontal angle from the image capture device.

C. The method as paragraph A recites, wherein the facial features comprise mouth features extracted from the target speaker facial image.

D. The method as paragraph C recites, wherein the mouth features comprise lip features extracted from the target speaker facial image by a learning model trained on a facial image dataset labeled with regard to lip features.

E. The method as paragraph A recites, wherein the audio signal is captured from an audio capture device comprising a single audio channel.

F. The method as paragraph A recites, wherein the audio signal is captured from audio capture devices comprising multiple audio channels.

G. A method comprising: computing motion vectors based on facial features of a target speaker facial image captured over a period of interest; and separating, based on at least the motion vectors, audio corresponding to a constituent source from a mixed source single-channel audio signal captured over the period of interest; wherein separating audio from the audio signal is performed by a fusion learning model comprising a plurality of learning sub-models.

H. The method as paragraph G recites, wherein computing the motion vectors comprises computing at least LLD vectors and optical flow vectors based on the facial features.

I. The method as paragraph G recites, wherein the motion vectors are further normalized at each time of the period of interest based on width and height of the target speaker facial image at that respective time.

J. The method as paragraph G recites, wherein the fusion learning model comprises at least one learning sub-model having an input layer receiving audio features as input, and at least one learning sub-model having an input layer receiving image features as input.

K. The method as paragraph J recites, further comprising fusing audio features output by at least one learning sub-model of the fusion learning model with image features output by at least one learning sub-model of the fusion learning model.

L. The method as paragraph K recites, wherein the fusion learning model further comprises at least one learning sub-model having an input layer receiving vectors comprising fused audio features and image features as input.

M. The method as paragraph L recites, wherein the fusion learning model outputs a target mask and a noise mask by performing source separation based on the fused audio features and video features.

N. A method comprising: computing a motion vector based on facial features of a target speaker facial image captured over a period of interest; and separating, based on at least the motion vector, audio corresponding to a constituent source from a mixed source multi-channel audio signal captured over the period of interest; wherein separating the audio from the audio signal is performed by a blind source separation ("BSS") learning model.

O. The method as paragraph N recites, wherein computing the motion vectors comprises computing at least lip motion vectors ("LMVs") based on the facial features.

P. The method as paragraph O recites, wherein computing the motion vectors further comprises computing a probability of speech by a hidden Markov model ("HMM") based on the LMVs.

Q. The method as paragraph P recites, wherein the fusion learning model comprises at least one learning sub-model having an input layer receiving audio features as input, and at least one learning sub-model having an input layer receiving image features as input.

R. The method as paragraph Q recites, further comprising outputting a detection result by a voice activity detection ("VAD") system based on the probability of speech.

S. The method as paragraph R recites, wherein the BSS learning model outputs the demixing matrix by an iterative computation based on supervision data.

T. The method as paragraph S recites, wherein the supervision data comprises the detection result output by the VAD system.

U. A system comprising: one or more processors; and memory communicatively coupled to the one or more processors, the memory storing computer-executable modules executable by the one or more processors that, when executed by the one or more processors, perform associated operations, the computer-executable modules comprising: a target speaker selecting module configured to select a target speaker facial image from a plurality of facial images captured over a period of interest; a facial feature extracting module configured to compute a motion vector based on facial features of the target speaker facial image; and a source separating module configured to separate, based on at least the motion vector, audio corresponding to a constituent source from a mixed source audio signal captured over the period of interest.

V. The system as paragraph U recites, wherein the plurality of facial images are detected in a captured image over different viewing angles from a perspective of an image capture device, and the target speaker selecting module is configured to select the target speaker facial image detected over a range of angles closest to a frontal angle from the image capture device.

W. The system as paragraph U recites, wherein the facial features comprise mouth features extracted from the target speaker facial image.

X. The system as paragraph W recites, wherein the mouth features comprise lip features extracted from the target speaker facial image by a learning model trained on a facial image dataset labeled with regard to lip features.

Y. The system as paragraph U recites, wherein the audio signal is captured from an audio capture device comprising a single audio channel.

Z. The system as paragraph U recites, wherein the audio signal is captured from audio capture devices comprising multiple audio channels.

AA. A computer-readable storage medium storing computer-readable instructions executable by one or more processors, that when executed by the one or more processors, cause the one or more processors to perform operations comprising: selecting a target speaker facial image from a plurality of facial images captured over a period of interest; computing a motion vector based on facial features of the target speaker facial image; and separating, based on at least the motion vector, audio corresponding to a constituent source from a mixed source audio signal captured over the period of interest.

BB. The computer-readable storage medium as paragraph AA recites, wherein the plurality of facial images are detected in a captured image over different viewing angles from a perspective of an image capture device, and the target speaker facial image is detected over a range of angles closest to a frontal angle from the image capture device.

CC. The computer-readable storage medium as paragraph AA recites, wherein the facial features comprise mouth features extracted from the target speaker facial image.

DD. The computer-readable storage medium as paragraph CC recites, wherein the mouth features comprise lip features extracted from the target speaker facial image by a learning model trained on a facial image dataset labeled with regard to lip features.

EE. The computer-readable storage medium as paragraph AA recites, wherein the audio signal is captured from an audio capture device comprising a single audio channel.

FF. The computer-readable storage medium as paragraph AA recites, wherein the audio signal is captured from audio capture devices comprising multiple audio channels.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
   extracting a lip motion vector ("LMV") from facial features of a target speaker facial image captured over a period of interest;
   augmenting the LMV by voice activity detection ("VAD") output; and
   separating, based on at least the motion vectors, audio corresponding to a constituent source from a multi-channel audio signal captured over the period of interest;
   wherein separating audio from the audio signal is performed by a blind source separation ("BSS") learning model outputting a demixing matrix.

2. The method of claim 1, wherein the LMV is extracted from mouth features; and
   augmenting the LMV by VAD output comprises selecting sample pixels corresponding to the mouth features.

3. The method of claim 2, wherein augmenting the LMV by VAD output further comprises computing a LMV from the selected sample pixels.

4. The method of claim 3, wherein augmenting the LMV by VAD output further comprises normalizing the LMV across time.

5. The method of claim 4, wherein augmenting the LMV by VAD output further comprises outputting, by a hidden Markov model ("HMM"), a probability of speech based on the normalized LMV.

6. The method of claim 5, wherein augmenting the LMV by VAD output further comprises outputting, by a VAD, a detection result based on the HMM output.

7. The method of claim 6, wherein the BSS learning model performs supervised BSS computation using the detection result as supervision data.

8. A system comprising:
   one or more processors; and
   memory communicatively coupled to the one or more processors, the memory storing computer-executable modules executable by the one or more processors that, when executed by the one or more processors, perform associated operations, the computer-executable modules comprising:
   a facial feature extracting module, further comprising:
   a lip motion vector computing submodule configured to extract a lip motion vector ("LMV") from facial features of a target speaker facial image captured over a period of interest and augment the LMV by voice activity detection ("VAD") output; and
   a source separating module configured to separate, based on at least the motion vectors, audio corresponding to a constituent source from a multi-channel audio signal captured over the period of interest;

wherein the source separating module is configured to separate audio from the audio signal is performed by a blind source separation ("BSS") learning model outputting a demixing matrix.

9. The system of claim 8, wherein the LMV is extracted from mouth features; and the facial feature extracting module further comprises a sample pixel selecting submodule configured to select sample pixels corresponding to the mouth features.

10. The system of claim 9, wherein the facial feature extracting module further comprises a lip motion vector selecting submodule configured to compute a LMV from the selected sample pixels.

11. The system of claim 10, wherein the facial feature extracting module further comprises a LMV normalizing submodule configured to normalize the LMV across time.

12. The system of claim 11, wherein the facial feature extracting module further comprises a speech probability determining submodule configured to output, by a hidden Markov model ("HMM"), a probability of speech based on the normalized LMV.

13. The system of claim 12, wherein the facial feature extracting module further comprises a detecting result determining submodule configured to output, by a VAD, a detection result based on the HMM output.

14. The system of claim 13, wherein the BSS learning model performs supervised BSS computation using the detection result as supervision data.

15. A non-transitory computer-readable storage medium storing computer-readable instructions executable by one or more processors, that when executed by the one or more processors, cause the one or more processors to perform operations comprising:

extracting a lip motion vector ("LMV") from facial features of a target speaker facial image captured over a period of interest;

augmenting the LMV by voice activity detection ("VAD") output; and separating, based on at least the motion vectors, audio corresponding to a constituent source from a multi-channel audio signal captured over the period of interest;

wherein separating audio from the audio signal is performed by a blind source separation ("BSS") learning model outputting a demixing matrix.

16. The non-transitory computer-readable storage medium of claim 15, wherein the LMV is extracted from mouth features; and augmenting the LMV by VAD output comprises selecting sample pixels corresponding to the mouth features.

17. The non-transitory computer-readable storage medium of claim 16, wherein augmenting the LMV by VAD output further comprises computing a LMV from the selected sample pixels, and augmenting the LMV by VAD output further comprises normalizing the LMV across time.

18. The non-transitory computer-readable storage medium of claim 17, wherein augmenting the LMV by VAD output further comprises outputting, by a hidden Markov model ("HMM"), a probability of speech based on the normalized LMV.

19. The non-transitory computer-readable storage medium of claim 18, wherein augmenting the LMV by VAD output further comprises outputting, by a VAD, a detection result based on the HMM output.

20. The non-transitory computer-readable storage medium of claim 19, wherein the BSS learning model performs supervised BSS computation using the detection result as supervision data.

* * * * *